United States Patent
Zhang et al.

(10) Patent No.: US 12,404,110 B2
(45) Date of Patent: Sep. 2, 2025

(54) CONVEYING DEVICE AND INSPECTION SYSTEM

(71) Applicants: NUCTECH COMPANY LIMITED, Beijing (CN); TSINGHUA UNIVERSITY, Beijing (CN)

(72) Inventors: Li Zhang, Beijing (CN); Zhiqiang Chen, Beijing (CN); Yuanjing Li, Beijing (CN); Qingping Huang, Beijing (CN); Weijun Guo, Beijing (CN); Liming Yao, Beijing (CN); Hui Ding, Beijing (CN); Junhao Liu, Beijing (CN); Jiajia Zhou, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 176 days.

(21) Appl. No.: 18/255,072

(22) PCT Filed: Nov. 22, 2021

(86) PCT No.: PCT/CN2021/132096
§ 371 (c)(1),
(2) Date: May 30, 2023

(87) PCT Pub. No.: WO2022/116861
PCT Pub. Date: Jun. 9, 2022

(65) Prior Publication Data
US 2024/0092584 A1    Mar. 21, 2024

(30) Foreign Application Priority Data
Dec. 4, 2020    (CN) .......................... 202011413588.5

(51) Int. Cl.
*B65G 13/10*    (2006.01)
*B65G 13/07*    (2006.01)
(Continued)

(52) U.S. Cl.
CPC ............. *B65G 13/10* (2013.01); *B65G 13/12* (2013.01); *B65G 13/07* (2013.01); *B65G 21/2045* (2013.01); *B65G 23/36* (2013.01)

(58) Field of Classification Search
None
See application file for complete search history.

(56) References Cited

U.S. PATENT DOCUMENTS

| 3,100,039 | A | * | 8/1963 | Oderman | ............... | B65G 47/80 198/370.09 |
| 6,542,580 | B1 | | 4/2003 | Carver et al. | | |

(Continued)

FOREIGN PATENT DOCUMENTS

| CN | 1857977 A | 11/2006 |
| CN | 101000312 A | 7/2007 |

(Continued)

OTHER PUBLICATIONS

Office Action with Translation Issued for Chinese Application No. 202011413588.5 dated Oct. 13, 2022 in 29 pages.
(Continued)

*Primary Examiner* — Kavel Singh
(74) *Attorney, Agent, or Firm* — Knobbe, Martens, Olson & Bear, LLP

(57) ABSTRACT

A conveying device (100) and an inspection system (1000) are provided. The conveying device includes: a first support frame (1); a first conveying mechanism (2) and a second conveying mechanism (3) which are installed on the first support frame; and a switching mechanism (4) configured to selectively lift the first conveying mechanism or the second (Continued)

conveying mechanism in a vertical direction, such that the first conveying mechanism or the second conveying mechanism carries goods (401) and conveys the goods in a first horizontal direction or a second horizontal direction different from the first horizontal direction. The conveying device may achieve a positioning and a smooth continuous conveying of goods, and achieve a smooth conveying and a calibrated positioning of the goods in different postures.

17 Claims, 15 Drawing Sheets

(51) Int. Cl.
    *B65G 13/12*     (2006.01)
    *B65G 21/20*     (2006.01)
    *B65G 23/36*     (2006.01)

(56) References Cited

U.S. PATENT DOCUMENTS

| | | | | |
|---|---|---|---|---|
| 6,644,459 | B2 * | 11/2003 | van Leeuwen | B65G 15/50 198/370.1 |
| 9,868,594 | B2 * | 1/2018 | Itoh | B65G 43/10 |
| 10,585,206 | B2 * | 3/2020 | Bendahan | G01V 5/22 |
| 11,485,582 | B2 * | 11/2022 | Ragan | B65G 23/12 |
| 11,827,458 | B2 * | 11/2023 | Para | B65G 13/071 |
| 2020/0189852 | A1 | 6/2020 | Karol et al. | |

FOREIGN PATENT DOCUMENTS

| | | |
|---|---|---|
| CN | 202156765 U | 3/2012 |
| CN | 105858111 A | 8/2016 |
| CN | 106185226 A | 12/2016 |
| CN | 206494533 U | 9/2017 |
| CN | 208499465 U | 2/2019 |
| CN | 209668177 U | 11/2019 |
| CN | 110732487 A | 1/2020 |
| EP | 3301486 A1 | 4/2018 |
| IT | MO20090308 A1 | 6/2011 |
| JP | 2003050216 A | 2/2003 |
| KR | 101866402 B1 | 6/2018 |

OTHER PUBLICATIONS

International Search Report with Translation for International Application No. PCT/CN2021/132096 dated Feb. 25, 2022 in 12 pages.
Extended European Search Report received for EP Application No. 21899895 as mailed Sep. 12, 2024 in 7 pages.

* cited by examiner

CONVEYING DEVICE AND INSPECTION SYSTEM

CROSS REFERENCE TO RELATED APPLICATION(S)

This application is a Section 371 National Stage Application of International Application No. PCT/CN2021/132096, filed on Nov. 22, 2021, entitled "CONVEYING DEVICE AND INSPECTION SYSTEM", which claims priority to Chinese Patent Application No. 202011413588.5 filed on Dec. 4, 2020, the entire content of which is incorporated herein by reference in its entirety.

TECHNICAL FIELD

The present disclosure relates to an inspection system, and in particular, to a conveying device suitable for conveying a container and an inspection system including the conveying device.

BACKGROUND

Radiation is usually used in a non-invasive inspection of objects such as luggage, a bag, a briefcase, etc. in an airport and a public building to identify hidden prohibited items. The prohibited items may include a hidden gun, a knife, an explosive device, an illegal drug, etc. A common inspection system is an X-ray machine. An inspected object passes between a fixed radiation source, such as X-ray radiation, etc., and a fixed detector. The radiation is calibrated into a fan-shaped or pencil-shaped radiation beam. The radiation transmitted through an object is attenuated to different degrees by items contained in the luggage. An attenuation of the radioactive ray is a function of a density of a substance through which the radiation beam passes. The attenuated radiation is detected and an X-ray photographic image of items contained in the object is generated for inspection. The image shows shapes, sizes, and different densities of the contained items.

At present, in the field of inspection of air goods (such as an air container), a manual inspection (unpacking inspection) and a X-ray machine (through which only small air containers may pass) projection are still main inspection methods, and a goods inspection device based on a CT (computed tomography) technology may also be used. Due to a low penetration ability of the X-ray machine of the goods inspection device and a strict restriction on use and management of a radioactive source, there are many restrictions on use of the two types of products.

A radiation inspection system for security inspection of the air container has been developed. A container trailer is used to transport container goods from an airport air freight station, and an automatic conveying system is provided to convey the goods to the radiation inspection system. The container trailer is provided with conveying rollers. The container as the goods is generally loaded and unloaded from a side of the trailer in a width direction, while in the automatic conveying system, the goods are mostly conveyed in a length direction. In order to meet a compatibility of the radiation inspection system suitable for inspecting the air container with different container loading and unloading modes, a conveying device that may convey the container in both the conventional length direction and the width direction is required.

SUMMARY

An object of the present disclosure is to solve at least one aspect of the above-mentioned problems and defects in the prior art.

According to an embodiment in an aspect of the present disclosure, a conveying device is provided, including: a first support frame; a first conveying mechanism and a second conveying mechanism which are installed on the first support frame; and a switching mechanism configured to selectively lift the first conveying mechanism or the second conveying mechanism in a vertical direction, such that the first conveying mechanism or the second conveying mechanism carries goods and conveys the goods in a first horizontal direction or a second horizontal direction different from the first horizontal direction.

According to an embodiment of the present disclosure, the conveying device further includes: a fixation base, wherein the first support frame is rotatably installed on the fixation base.

According to an embodiment of the present disclosure, the first conveying mechanism or the second conveying mechanism carries and conveys the goods on a substantially same horizontal support surface.

According to an embodiment of the present disclosure, the first horizontal direction is substantially perpendicular to the second horizontal direction.

According to an embodiment of the present disclosure, the first support frame includes: an annular frame; a first base installed at a lower portion of the annular frame; and a rotating ring arranged on the first base and located at a center of the annular frame, and wherein the fixation base includes: a second base fixedly installed relative to the ground; and a first pivot fixed on the second base, wherein the rotating ring is rotatably installed on the first pivot.

According to an embodiment of the present disclosure, the conveying device further includes: a first driving mechanism configured to drive the rotating ring to rotate relative to the fixation base.

According to an embodiment of the present disclosure, the first driving mechanism includes: a first support seat fixedly installed relative to the ground; a first motor installed on the first support seat; and a first driving wheel installed on a driving shaft of the first motor, wherein the first driving wheel is in rotatable contact with the annular frame so as to drive the rotating ring to rotate.

According to an embodiment of the present disclosure, the conveying device further includes: a plurality of balance mechanisms fixedly installed relative to the ground and rotatably supported at the lower portion of the annular frame at a predetermined interval, so as to keep a transverse frame substantially parallel to a horizontal plane.

According to an embodiment of the present disclosure, each of the plurality of balance mechanisms includes: a second support seat fixedly installed relative to the ground; and at least one first rolling wheel installed on the second support seat, wherein the at least one first rolling wheel rotatably supports the annular frame.

According to an embodiment of the present disclosure, the first conveying mechanism includes: a second support frame installed on the first support frame; a first rolling mechanism installed on the second support frame and suitable for carrying the goods under a drive of the switching mechanism; and a second driving mechanism suitable for driving the first rolling mechanism to rotate relative to the second support frame, such that the first rolling mechanism pushes the goods to move in the first horizontal direction.

According to an embodiment of the present disclosure, the second conveying mechanism includes: a third support frame installed on the first support frame; a second rolling mechanism installed on the third support frame and suitable for carrying the goods under the drive of the switching mechanism; and a third driving mechanism suitable for driving the second rolling mechanism to rotate relative to the third support frame, such that the second rolling mechanism pushes the goods to move in the second horizontal direction.

According to an embodiment of the present disclosure, the switching mechanism includes: a plurality of first lifting mechanisms suitable for lifting the second support frame; a plurality of second lifting mechanisms suitable for lifting the third support frame; and a fourth driving mechanism configured to selectively drive the plurality of first lifting mechanisms to lift the second support frame, or drive the plurality of second lifting mechanisms to lift the third support frame.

According to an embodiment of the present disclosure, the fourth driving mechanism includes: a second motor; and two first driving shafts configured to rotate synchronously under a drive of the second motor, wherein the first lifting mechanism includes first cams installed on the two first driving shafts, and the second lifting mechanism includes second cams installed on the two first driving shafts, and wherein the first cam and the second cam are suitable for respectively lifting the second support frame and the third support frame under a drive of the first driving shaft.

According to an embodiment of the present disclosure, the first cam and the second cam are configured such that: within a first angle range of a rotation of the first driving shaft, the first rolling mechanism carries and conveys the goods within the horizontal support surface, a maximum height of the second rolling mechanism is not higher than the horizontal support surface, and the second rolling mechanism leaves the goods during the first rolling mechanism conveying the goods; within a second angle range of the rotation of the first driving shaft, the second rolling mechanism carries and conveys the goods within the horizontal support surface; a maximum height of the first rolling mechanism is not higher than the horizontal support surface, and the first rolling mechanism leaves the goods during the second rolling mechanism conveying of the goods, and when the rotation of the first driving shaft is transiting between the first angle range and the second angle range, the first rolling mechanism and the second rolling mechanism jointly support the goods within the horizontal support surface.

According to an embodiment of the present disclosure, during the rotation of the first driving shaft from 0 degree to 360 degrees, the first angle range is 0 degree to 180 degrees, and the second angle range is 180 degrees to 360 degrees.

According to an embodiment of the present disclosure, each of the first cam and the second cam includes a first part and a second part, and wherein in a cross section along a radial direction, a support surface of the first part is a semicircular arc, a support surface of the second part is an elliptical arc along a major axis of an ellipse, and the semicircular arc of the first part is smoothly connected to the elliptical arc of the second part.

According to an embodiment of the present disclosure, the fourth driving mechanism further includes: a first transmission mechanism, wherein the second motor drives the two first driving shafts to rotate through the first transmission mechanism; and a plurality of third support seats installed on the first support frame, wherein the two first driving shafts are rotatably supported on the third support seats.

According to an embodiment of the present disclosure, the first transmission mechanism includes two first conveyor belts, and the second motor respectively drives the two first driving shafts to rotate through the first conveyor belts.

According to an embodiment of the present disclosure, the second support frame includes: two first longitudinal frames arranged opposite to each other, and two first transverse frames arranged between the first longitudinal frames; and wherein the first rolling mechanism includes: a plurality of pairs of fourth support seats, wherein each pair of fourth support seats are installed opposite to each other on the two first longitudinal frames; and a plurality of rollers arranged parallel to each other, wherein two ends of each of the plurality of rollers are rotatably installed on a pair of fourth support seats so as to drive the goods to move in the first horizontal direction.

According to an embodiment of the present disclosure, the second driving mechanism includes: a fifth support seat installed on the second support frame; a third motor installed on the fifth support seat; and a second transmission mechanism, wherein the third motor drives the roller to rotate through the second transmission mechanism.

According to an embodiment of the present disclosure, the second transmission mechanism includes: a second conveyor belt, wherein the third motor drives a driving roller in the plurality of rollers to rotate through the second conveyor belt; and a plurality of third conveyor belts, wherein the driving roller sequentially drives each driven roller in the plurality of rolling drums to rotate through the plurality of third conveyor belts.

According to an embodiment of the present disclosure, the conveying device further includes: a plurality of first auxiliary roller arranged on the first support frame outside the first transverse frame, wherein each of the plurality of first auxiliary rollers is arranged parallel to the roller.

According to an embodiment of the present disclosure, the first auxiliary roller rotates under a drive of the goods during the first conveying mechanism conveying the goods.

According to an embodiment of the present disclosure, the third support frame includes: two second longitudinal frames arranged opposite to each other; and a plurality of second transverse frames, wherein two ends of each of the plurality of second transverse frames are installed between the second longitudinal frames and located between two adjacent rollers; and wherein the second rolling mechanism includes: a plurality of rows of sixth support seats, wherein each row of sixth support seats are installed on a second transverse frame; and a plurality of rows of rolling wheels rotatably installed on the plurality of rows of sixth support seats, respectively, wherein a rotation shaft of each rolling wheel extends perpendicular to the second horizontal direction so as to drive the goods to move in the second horizontal direction.

According to an embodiment of the present disclosure, the third driving mechanism includes: a seventh support seat installed on the third support frame; a fourth motor installed on the seventh support seat; and a third transmission mechanism, wherein the fourth motor drives each rolling wheel to rotate through the third transmission mechanism.

According to an embodiment of the present disclosure, the third transmission mechanism includes: a plurality of eighth support seats installed at a lower portion of the second transverse frame; a second driving shaft rotatably installed on the eighth support seat, wherein the second driving shaft extends in a direction perpendicular to the second horizontal direction; a fourth conveyor belt, wherein the fourth motor drives the second driving shaft to rotate through the fourth conveyor belt; a fifth conveyor belt, wherein the second driving shaft drives a first rolling wheel in each row of rolling wheels to rotate through the fifth conveyor belt; and a plurality of sixth conveyor belts, wherein the first rolling wheel sequentially drives each second rolling wheel in each row of rolling wheels to rotate through the plurality of sixth conveyor belts.

According to an embodiment of the present disclosure, the second rolling mechanism further includes: a plurality of rows of auxiliary rolling wheels, wherein each row of auxiliary rolling wheels are rotatably installed on the sixth support seat between two adjacent rows of rolling wheels.

According to an embodiment of the present disclosure, the conveying device further includes: a plurality of second auxiliary rollers arranged on the first support frame outside the first longitudinal frame, wherein each of the plurality of second auxiliary rollers is arranged parallel to an axis of the rolling wheel.

According to an embodiment of the present disclosure, the second auxiliary roller rotates under a drive of the goods during the second conveying mechanism conveying the goods.

According to an embodiment of the present disclosure, the conveying device further includes: a guide mechanism suitable for guiding the second support frame and the third support frame to move in the vertical direction.

According to an embodiment of the present disclosure, the guide mechanism includes: a plurality of guide columns installed on the first support frame in the vertical direction; a plurality of first guide blocks installed on the second support frame, wherein each of the plurality of first guide blocks is provided with a guide hole matched with the guide column; and a plurality of second guide blocks installed on the third support frame, wherein each of the plurality of second guide blocks is provided with a guide hole matched with the guide column.

According to an embodiment of the present disclosure, one first guide block and one second guide block share one guide column, there is a gap between the first guide block and the second guide block in the vertical direction, and the gap is not less than a maximum height of a movement of the first conveying mechanism or the second conveying mechanism in the vertical direction.

According to an embodiment of the present disclosure, the conveying device further includes: a sensor suitable for detecting that the conveying device is provided with the goods, the goods are being loaded onto the conveying device and the goods are being unloaded from the conveying device.

According to an embodiment in another aspect of the present disclosure, an inspection system is provided, including: an inspection channel; one or two conveying devices according to any one of the above-mentioned embodiments, wherein the conveying device is installed outside at least one of an entrance and an exit of the inspection channel so as to convey the goods into the inspection channel and/or receive the goods output from the inspection channel; and an inspection device configured to inspect the goods conveyed by the conveying device.

DETAILED DESCRIPTION OF EMBODIMENTS

Figure 1:
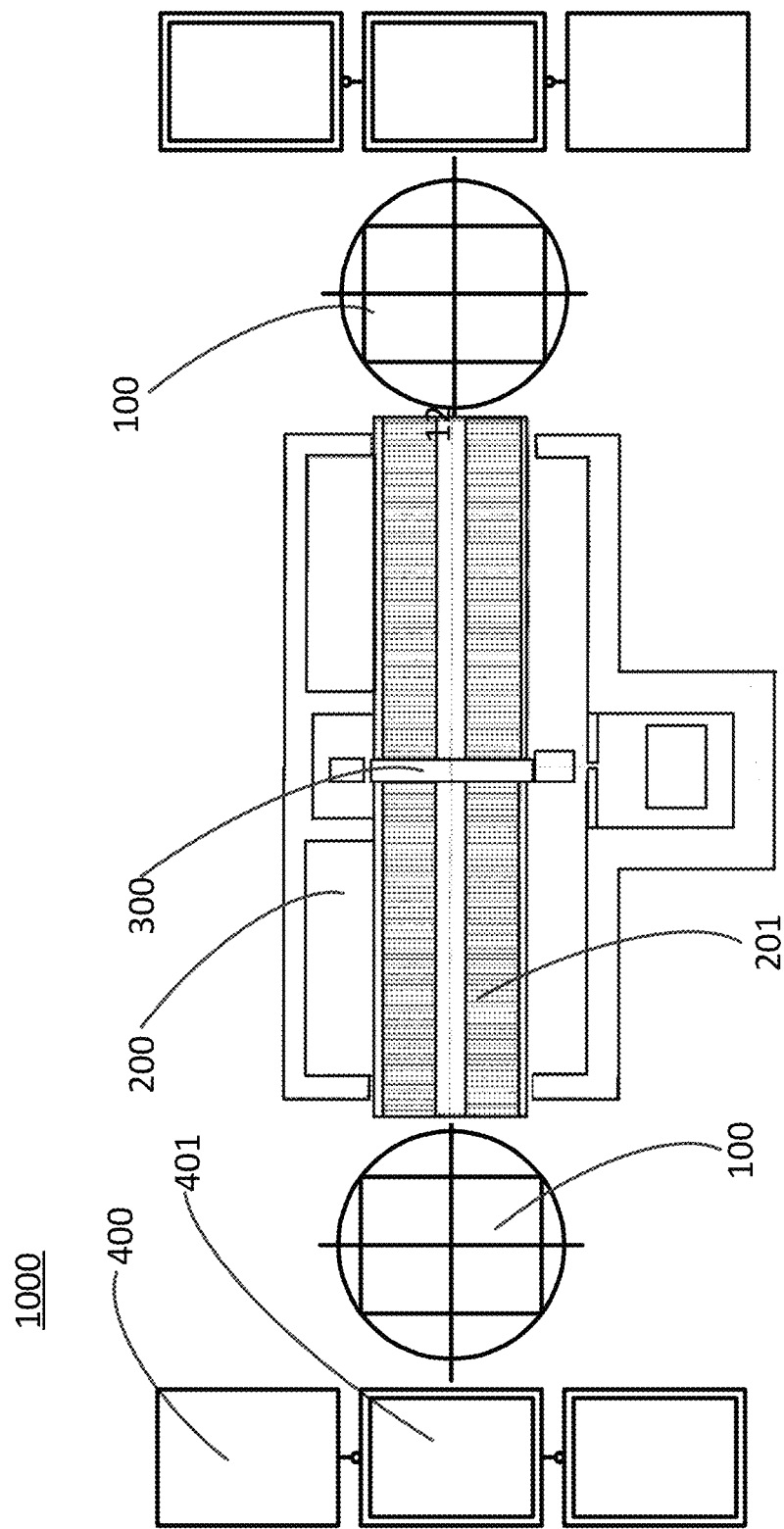
FIG. 1 shows a simple schematic diagram of an inspection system according to an exemplary embodiment of the present disclosure.

Technical solutions in embodiments of the present disclosure will be clearly and completely described with reference to accompanying drawings in embodiments of the present disclosure. Obviously, the described embodiments are some, but not all of embodiments of the present disclosure. The following descriptions of at least one exemplary embodiment are actually only illustrative and do not serve as any limitation on the present disclosure or an application or use thereof. Based on embodiments of the present disclosure, all other embodiments obtained by those of ordinary skill in the art without any creative work fall within the scope of protection of the present disclosure.

In the following detailed descriptions, many specific details are set forth to provide a comprehensive understanding of embodiments of the present disclosures for ease of explanation. However, it is obvious that one or more embodiments may also be implemented without these specific details. In other cases, well-known structures and devices are illustrated to simplify the accompanying drawings. Techniques, methods, and apparatuses known to those of ordinary skill in the relevant art may not be discussed in detail. However, in appropriate cases, the techniques, methods, and apparatuses should be considered as a part of the authorized specification.

In the descriptions of the present disclosure, it should be understood that orientations or positional relationships indicated by directional words such as "front, back, top, bottom, left, right", "horizontal, longitudinal, vertical, horizontal", "top, bottom", etc. are usually based on orientations or positional relationships as shown in the accompanying drawings, and are based on a traveling direction of a vehicle, which is only for ease of describing the present disclosure and simplifying the descriptions. Unless otherwise stated, these directional terms do not indicate or imply that the referred device or element must have a specific orientation or be constructed and operated in a specific orientation. Therefore, they may not be construed as limiting the scope of protection of the present disclosure. Directional words "inside, outside" refer to be inside and outside with respect to a contour of each component itself.

In the descriptions of the present disclosure, it should be understood that the use of words such as "first", "second", etc. to define components is only for ease of distinguishing corresponding components. Unless otherwise stated, the above-mentioned words have no special meaning and may not be construed as limiting the scope of protection of the present disclosure.

According to a general inventive concept of the present disclosure, a conveying device is provided, including: a first support frame; a first conveying mechanism and a second conveying mechanism installed on the first support frame; and a switching mechanism. The switching mechanism is configured to selectively lift the first conveying mechanism or the second conveying mechanism in a vertical direction, such that the first conveying mechanism or the second conveying mechanism carries goods and conveys the goods in a first horizontal direction or a second horizontal direction different from the first horizontal direction.

According to another general inventive concept of the present disclosure, an inspection system is provided, including: an inspection channel; the above-mentioned conveying device installed outside at least one of an entrance and an exit of the inspection channel to convey goods into the inspection channel and/or receive the goods output from the inspection channel; and an inspection device configured to inspect the goods conveyed by the conveying device.

FIG. 1 shows a simple schematic diagram of an inspection system according to an exemplary embodiment of the present disclosure.

In an exemplary embodiment, as shown in FIG. 1, an inspection system 1000 is suitable for inspecting whether prohibited items such as drugs, explosives and combustibles exist in goods 401 such as a container and a large goods basket that is suitable for centralized storage at a station, an airport, a dock and other places. The present disclosure will be further described by taking the inspected goods as the container as an example. The inspection system 1000 includes: an inspection channel 200, a conveying device 100 and an inspection device 300. The conveying device 100 is installed outside at least one of an entrance and an exit of the inspection channel 200 to convey the goods 401 into the inspection channel 200 and/or receive the goods output from the inspection channel 200. A conveying mechanism 201 for moving the goods 401 is provided in the inspection channel 200. The inspection device 300 is configured to inspect the goods 401 conveyed by the conveying device 100.

In an exemplary embodiment, the inspection device 300 includes an X-ray scanning device based on the CT (computed tomography) technology. Generally, the conveying device 100 is provided at the entrance and/or the exit of the inspection channel 200, and an container to be inspected is conveyed by a trailer 400 to the vicinity of the entrance of the inspection channel 200; the conveying device rotates the goods 401 by 90 degrees, and then conveys the goods in a length direction into the inspection channel 200; the goods are conveyed from the conveying mechanism 201 to the inspection device 300 in the inspection channel 200; the inspection device 300 performs a CT scanning inspection on the goods; after that, the goods 401 is further conveyed by the conveying mechanism 201 to the conveying device 100, and the conveying device 100 rotates the goods 401 by 90 degrees; finally, the goods are moved to the trailer 400 to complete an X-ray scanning inspection of the goods.

In an exemplary embodiment, the container as the inspected goods 401 is an air goods container. The air goods container is used to hold a plurality of pieces of luggage and other goods to be stored in an aircraft body, and a dimension (length, height, width) of the air goods container ranges from approximately 35×21×21 inches (0.89×0.53×0.53 meters) to approximately 240×118×96 inches (6.1×3.0×2.4 meters), such as 48×48×65 inches (1.2×1.2×1.7 meters).

Figure 2:
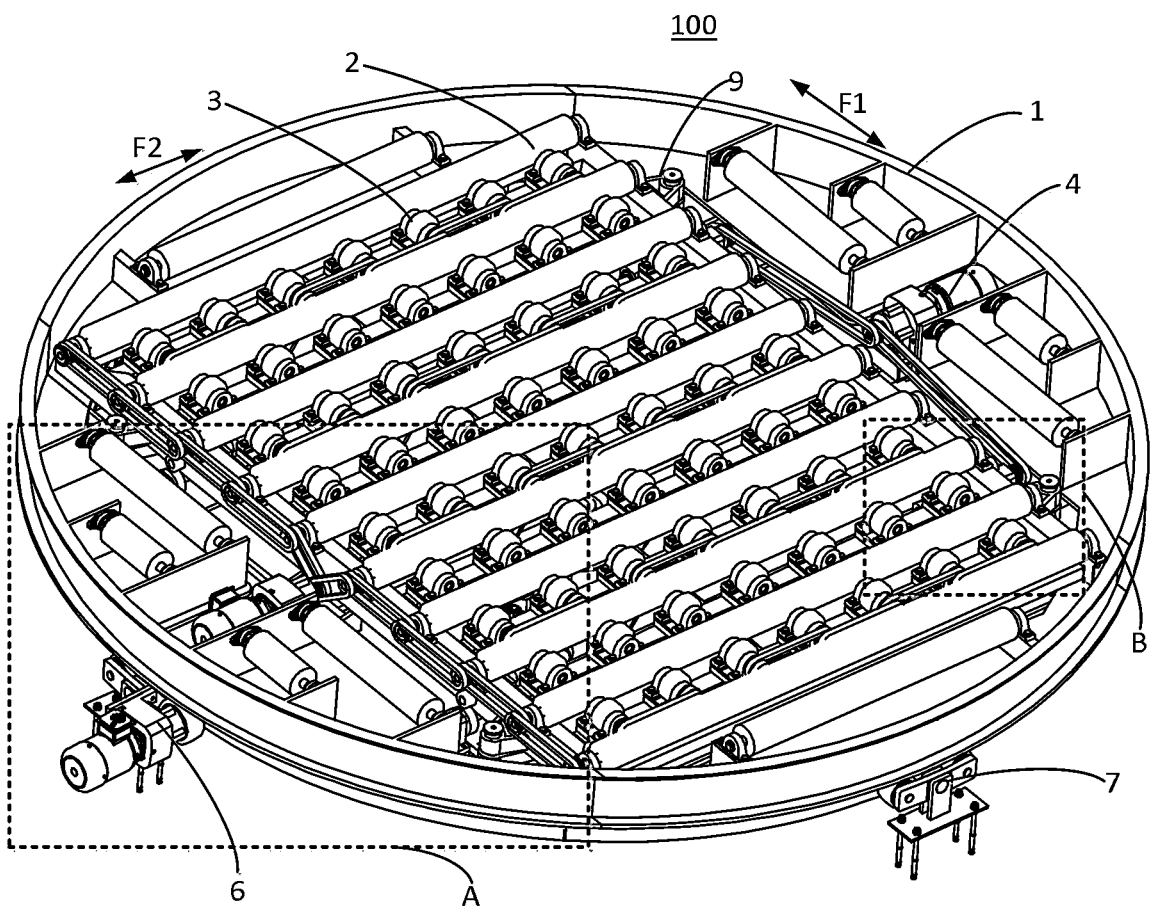
FIG. 2 shows a three-dimensional schematic diagram of a conveying device according to an exemplary embodiment of the present disclosure.
Figure 3:
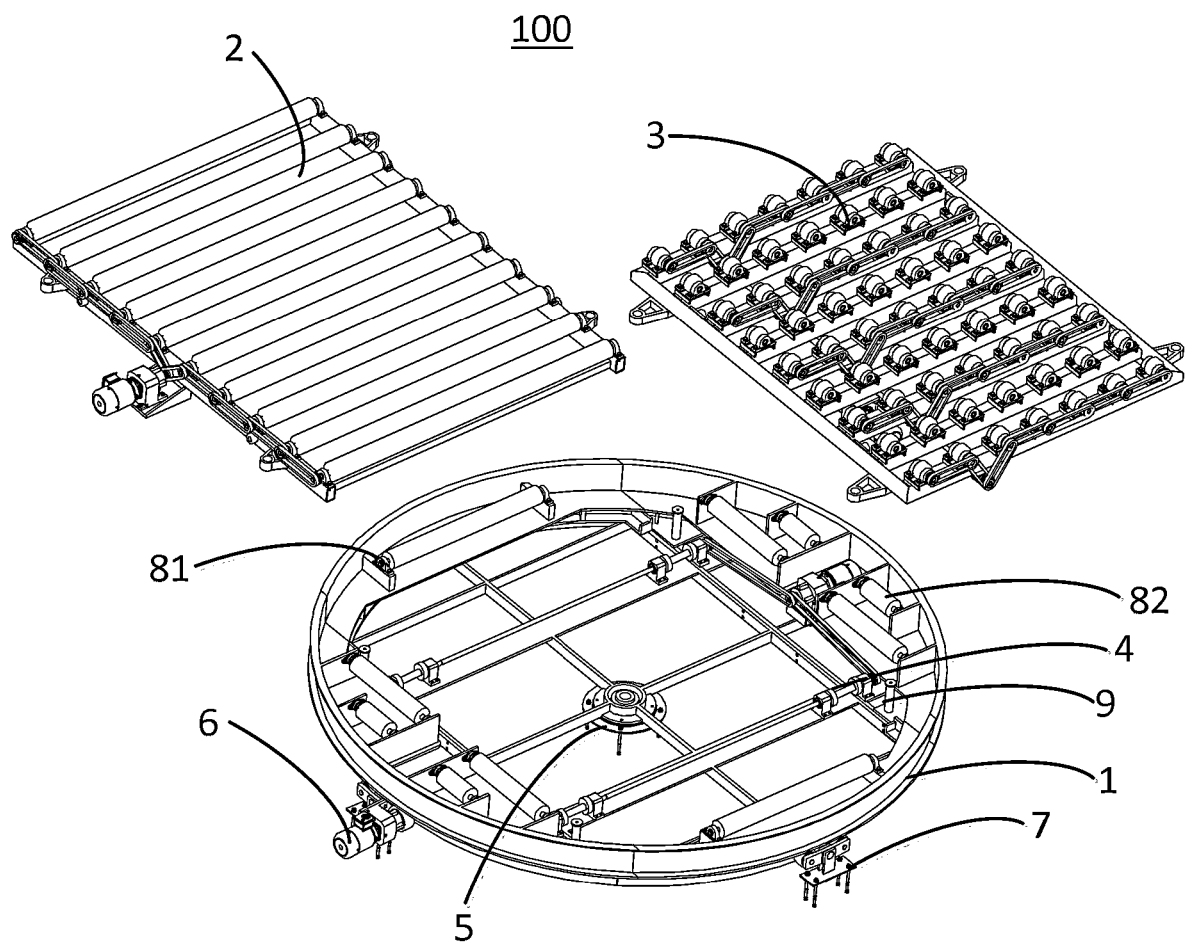
FIG. 3 shows an exploded schematic diagram of the conveying device shown in FIG. 2.

FIG. 2 shows a three-dimensional schematic diagram of a conveying device according to an exemplary embodiment of the present disclosure; FIG. 3 shows an exploded schematic diagram of the conveying device shown in FIG. 2.

In an exemplary embodiment, as shown in FIG. 2 to FIG. 3, the conveying device 100 includes: a first support frame 1, a first conveying mechanism 2, a second conveying mechanism 3 and a switching mechanism 4. The first conveying mechanism 2 and the second conveying mechanism 3 are movably installed on the first support frame 1. The switching mechanism 4 is configured to selectively lift the first conveying mechanism 2 or the second conveying mechanism 3 in a vertical direction, such that the first conveying mechanism 2 or the second conveying mechanism 3 carries the goods 401 such as the container and convey the goods 401 in a first horizontal direction or a second horizontal direction different from the first horizontal direction. That is, when the switching mechanism 4 lifts the conveying mechanism 2, the first conveying mechanism 2 carries the goods and conveys the goods in the first horizontal direction; when the switching mechanism 4 lifts the second conveying mechanism 3, the second conveying mechanism 3 carries the goods and conveys the goods in the second horizontal direction. In this way, the conveying device 100 may convey the goods in different horizontal directions.

Figure 6:
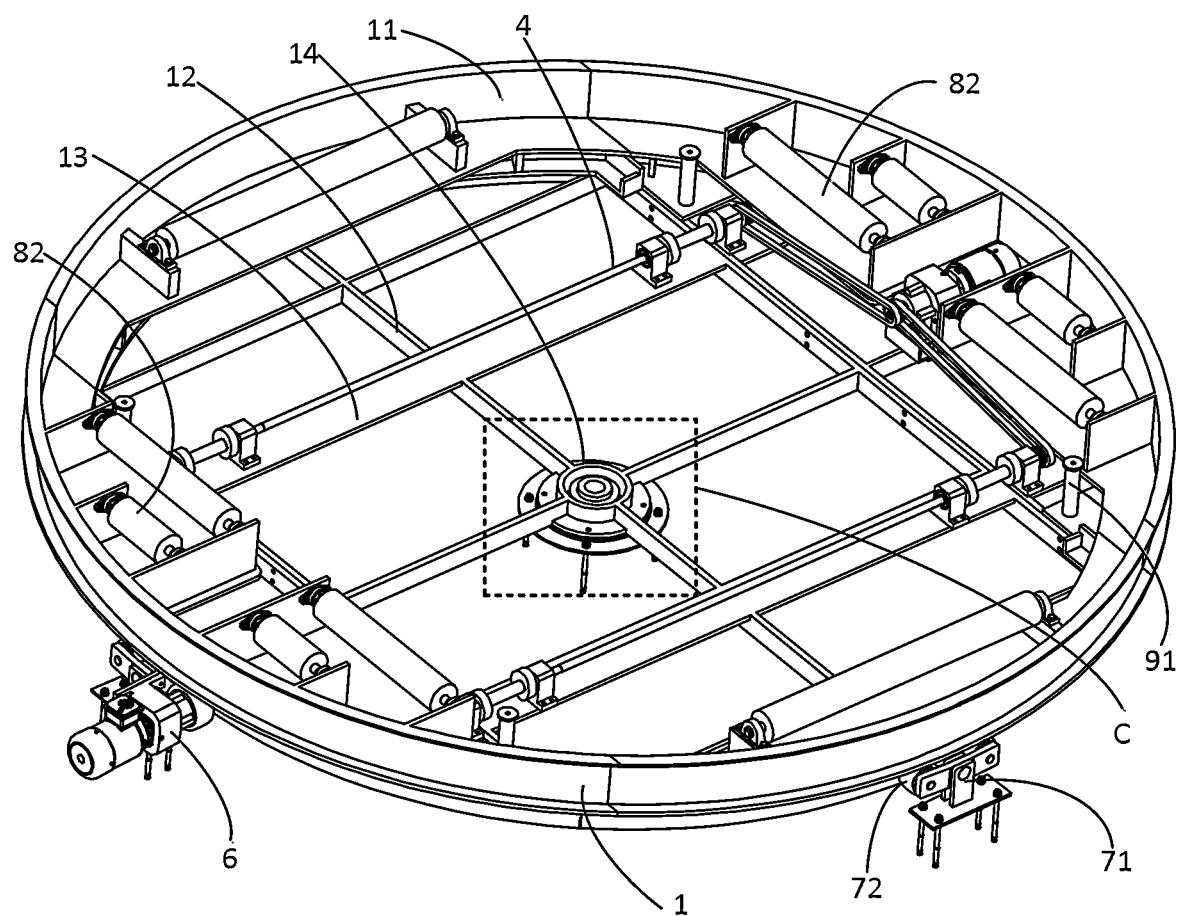
FIG. 6 shows a three-dimensional schematic diagram of a first support frame and a switching mechanism of a conveying device according to an exemplary embodiment of the present disclosure.
Figure 7:
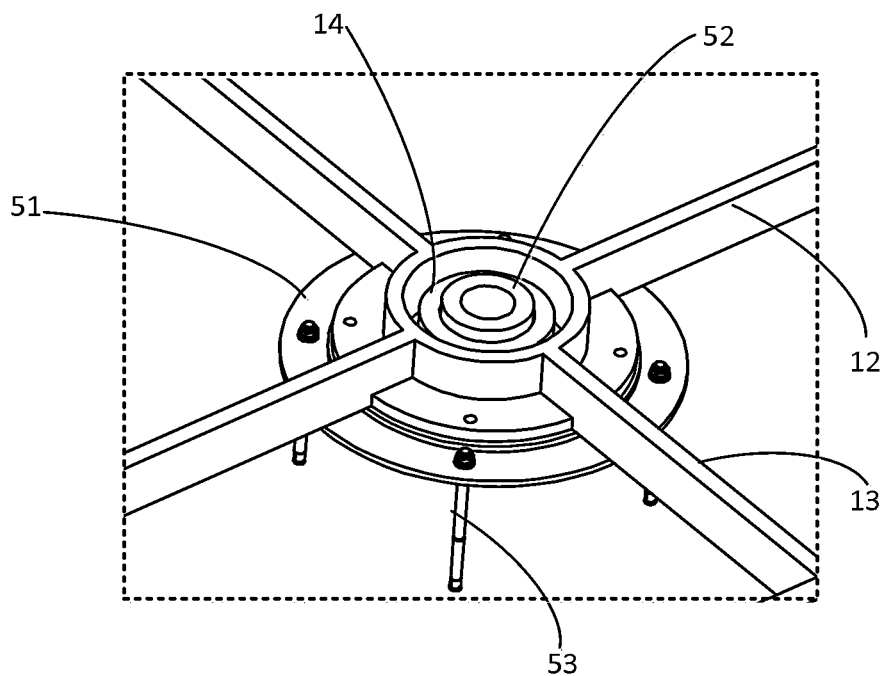
FIG. 7 shows an enlarged schematic diagram of a portion C shown in FIG. 6.

FIG. 6 shows a three-dimensional schematic diagram of a first support frame and a switching mechanism of a conveying device according to an exemplary embodiment of the present disclosure; FIG. 7 shows an enlarged schematic diagram of a portion C shown in FIG. 6.

In an exemplary embodiment, as shown in FIG. 2, FIG. 3, FIG. 6 and FIG. 7, the conveying device 100 further includes a fixation base 5, and the first support frame 1 is rotatably installed on the fixation base 5. For example, the first support frame 1 may rotate within a range of 90 degrees, 180 degrees, or 360 degrees relative to the fixation base 5. In an embodiment, the first horizontal direction is substantially perpendicular to the second horizontal direction.

As shown in FIG. 1, during an operation of moving the container on the trailer 400 to the conveying mechanism 201 of the inspection channel 200, the first support frame 1 is rotated such that a conveying direction (the first horizontal direction) of the first conveying mechanism 2 is parallel to the length direction of the container, and a width direction of the container is parallel to the second horizontal direction; the switching mechanism 4 lifts the second conveying mechanism 3 and lowers the first conveying mechanism 2, such that the second conveying mechanism 3 receives the container unloaded from the trailer 400. When a part of a width of the container is loaded onto the conveying device 100, the second conveying mechanism 3 conveys the container in the second horizontal direction, such that the entire container gradually moves onto the conveying device 100 in the width direction. Then, the first support frame 1 rotates by 90 degrees, and the container rotates by 90 degrees as well, the length direction of the container is still parallel to the first horizontal direction, the switching mechanism 4 lifts the first conveying mechanism 2 and lowers the second conveying mechanism 3, such that the first conveying mechanism 2 carries the container. After that, the first conveying mechanism 2 conveys the container in the first horizontal direction, such that the container moves onto the conveying mechanism 201 of the inspection channel 200 in the length direction of the container.

As shown in FIG. 1, during an operation of moving the container on the conveying mechanism 201 of the inspection channel 200 to the trailer 400, the first support frame 1 is rotated such that the conveying direction (the first horizontal direction) of the first conveying mechanism 2 is parallel to the length direction of the container; the switching mechanism 4 lifts the first conveying mechanism 2 and lowers the second conveying mechanism 3, such that the first conveying mechanism 2 receives the container conveyed from the conveying mechanism 201 of the inspection channel 200. When the container is partially loaded onto the conveying device 100, the first conveying mechanism 3 conveys the container in the first horizontal direction, such that the entire container gradually moves onto the conveying device 100 in the length direction. Then, the first support frame 1 rotates by 90 degrees, the container rotates by 90 degrees as well, and the length direction of the container is still parallel to the first horizontal direction. The switching mechanism 4 lifts the second conveying mechanism 3 and lowers the first conveying mechanism 2, such that the second conveying mechanism 3 carries the container. After that, the second conveying mechanism 3 conveys the container in the second horizontal direction, such that the container moves onto the trailer 400 in the width direction of the container.

In an exemplary embodiment, the first conveying mechanism 2 or the second conveying mechanism 3 carry and convey the goods on a substantially same horizontal support surface. In this way, during a switching process of the first conveying mechanism 2 or the second conveying mechanism 3 carrying the goods, a height of the goods does not change. It may be understood that a height of the horizontal support surface is substantially equal to a height of a horizontal support surface of the trailer and the conveying mechanism 201.

In an exemplary embodiment, as shown in FIG. 2, FIG. 3, FIG. 6 and FIG. 7, the first support frame 1 includes: an annular frame 11; a first base installed at a lower portion of the annular frame 11; and a rotating ring 14 arranged on the first base and located in a center of the annular frame 11. The first base may include: a plurality of longitudinal support beams 12 and a plurality of transverse support beams 13.

Alternatively, the first base may include a support plate that partially or completely covers the lower portion of the annular frame 11. The fixation base 5 includes: for example, a second base 51 fixedly installed relative to the ground through a bolt 53; and a first pivot 52 fixed on the second base 51, and the rotating ring 14 is rotatably installed on the first pivot 52. In this way, the first support frame 1 may rotate relative to the ground.

Figure 4:
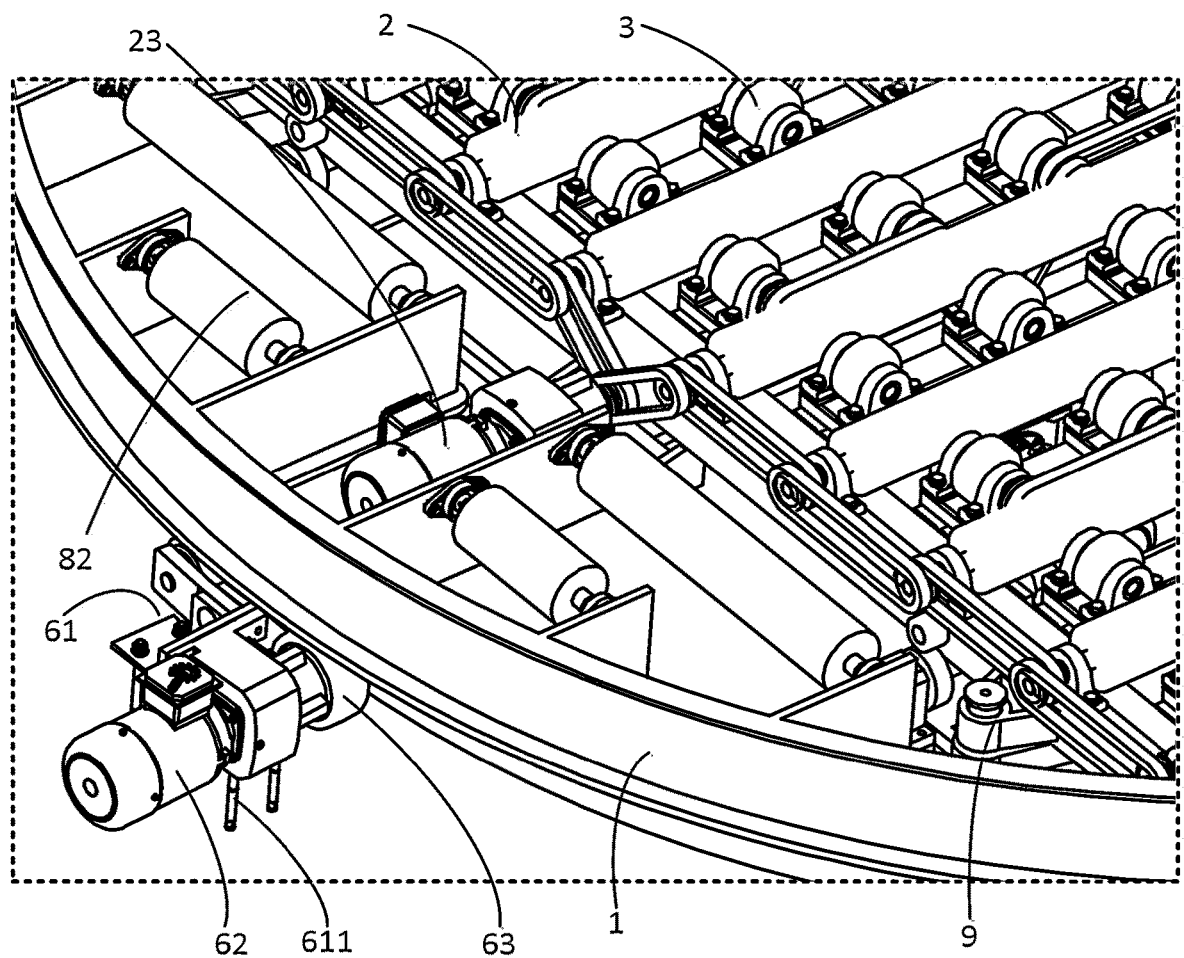
FIG. 4 shows an enlarged schematic diagram of a portion A shown in FIG. 2.

FIG. 4 shows an enlarged schematic diagram of a portion A shown in FIG. 2.

In an exemplary embodiment, as shown in FIG. 2-4, FIG. 6 and FIG. 7, the conveying device 100 further includes a first driving mechanism 6 configured to drive the rotating ring 14 to rotate relative to the fixation base 5. Further, the first driving mechanism includes: a first support seat 61 fixedly installed relative to the ground through a bolt 611; a first motor 62 installed on the first support seat 61; and a first driving wheel 63 installed on a driving shaft of the first motor 62, wherein the first driving wheel 63 is in rotatable contact with a bottom portion or a lateral portion of the annular frame 11 so as to drive the rotating ring 14 to rotate relative to the fixation base 5. The first driving wheel 63 may be in frictional contact with the bottom portion or the lateral portion of the annular frame 11, or may be in contact with the bottom portion or the lateral portion of the annular frame 11 by combining a gear with a rack. In an alternative embodiment, the first motor drives the annular frame 11 to rotate through a conveyor belt. One or two sets of first driving mechanisms may be provided to drive the annular frame 11 to rotate within a range of 0-90 degrees or 0-180 degrees.

In an alternative embodiment, a reduction mechanism may be coupled to an output shaft of the first motor 62 so as to control a rotational speed of the annular frame 11.

In an exemplary embodiment, the conveying device 100 further includes: a plurality of balance mechanisms 7 fixedly installed relative to the ground and rotatably supported at a lower portion of the transverse frame 11 at a predetermined interval, such that the annular frame 11 is kept to be substantially parallel to a horizontal plane. For example, each balance mechanism 7 includes: a second support seat 71 fixedly installed relative to the ground through a bolt; and at least one first rolling wheel 72 installed on the second support seat 71 and rotatably supporting the annular frame 11.

Figure 10:
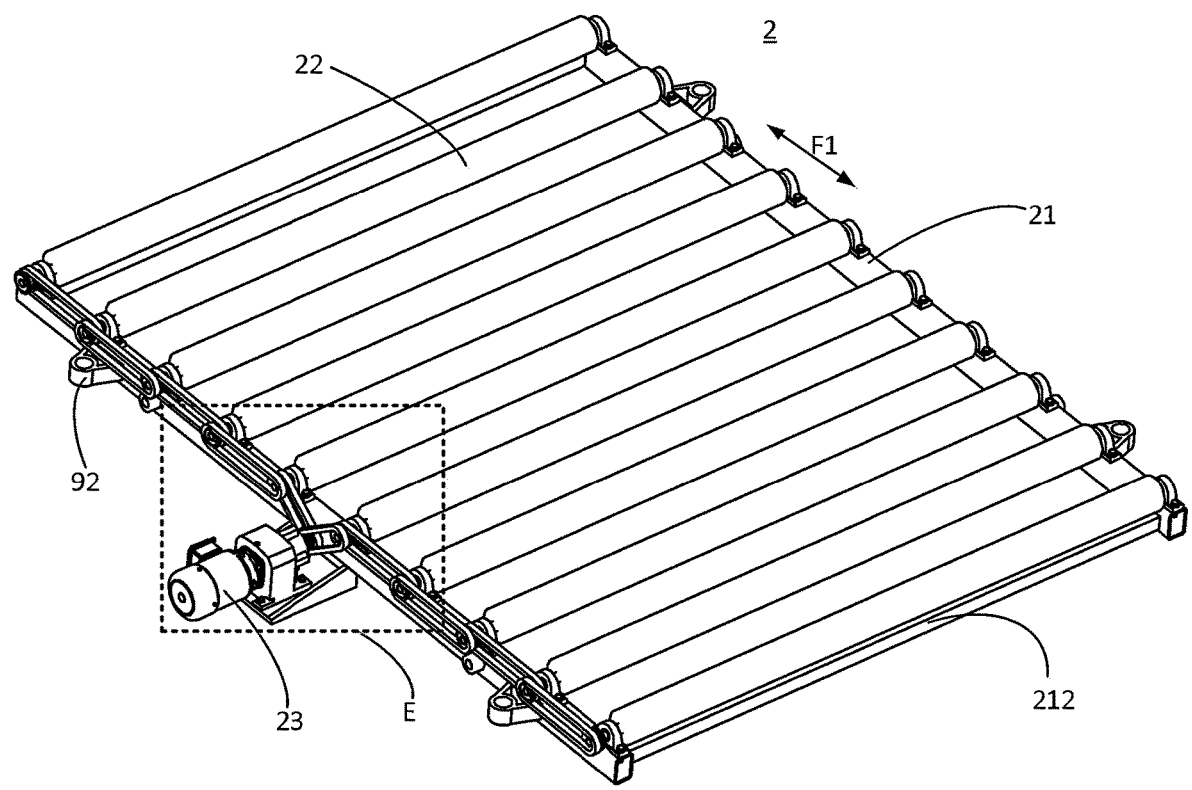
FIG. 10 shows a three-dimensional schematic diagram of a first conveying mechanism of a conveying device according to an exemplary embodiment of the present disclosure.
Figure 11:
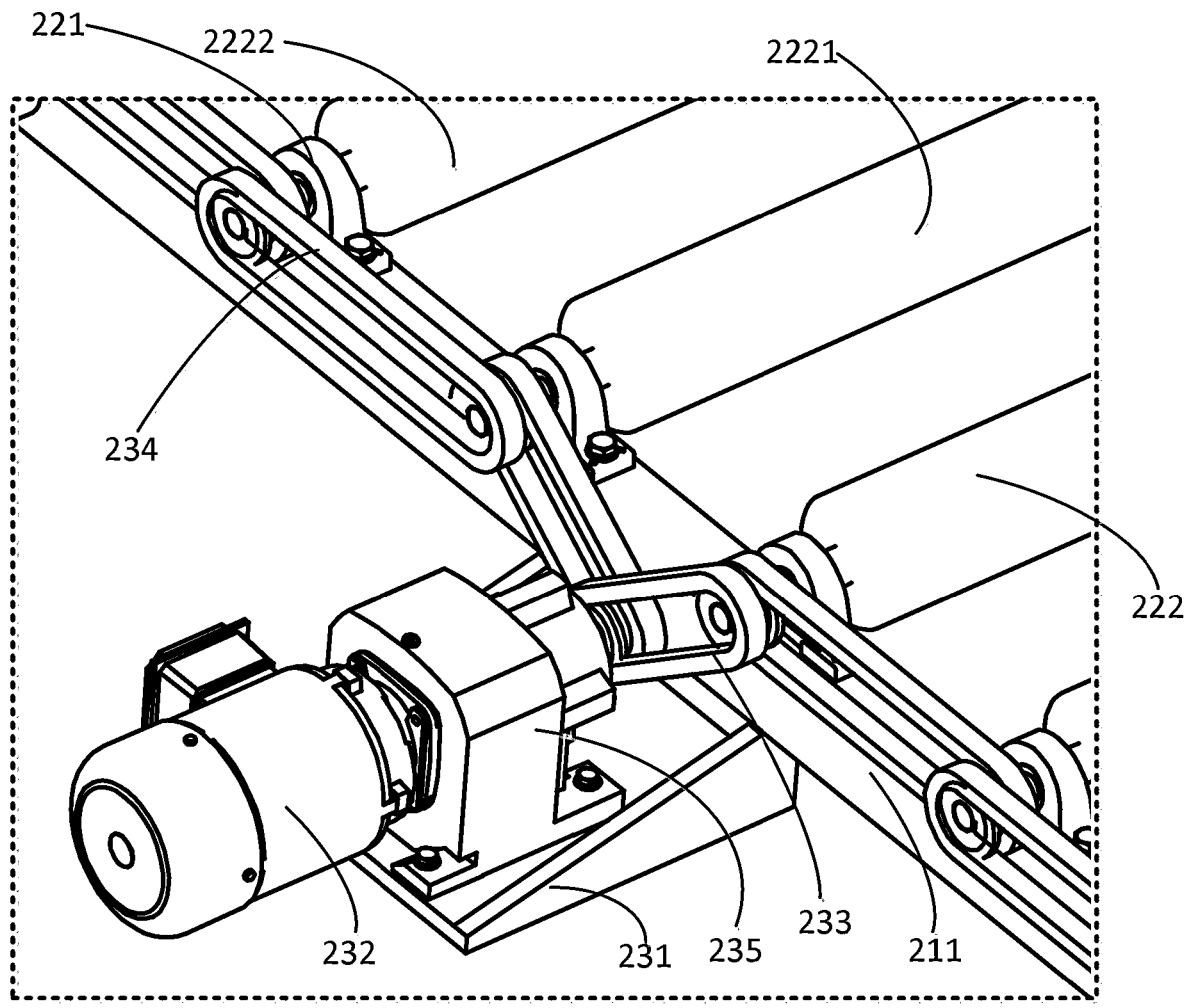
FIG. 11 shows an enlarged schematic diagram of a portion E shown in FIG. 10.

FIG. 10 shows a three-dimensional schematic diagram of a first conveying mechanism of a conveying device according to an exemplary embodiment of the present disclosure; and FIG. 11 shows an enlarged schematic diagram of a portion E shown in FIG. 10.

In an exemplary embodiment, as shown in FIG. 2-4, FIG. 10 and FIG. 11, the first conveying mechanism 2 includes: a second support frame 21 installed on the first support frame 1; a first rolling mechanism 22 installed on the second support frame 21 and suitable for carrying the goods 401 under a drive of the switching mechanism 4; and a second driving mechanism 23 suitable for driving the first rolling mechanism 22 to rotate relative to the second support frame 21. In this way, when the switching mechanism 4 lifts the second support frame 21 such that the first rolling mechanism 23 carries the goods, the first rolling mechanism 22 pushes the goods 401 to move in the first horizontal direction F1.

Figure 12:
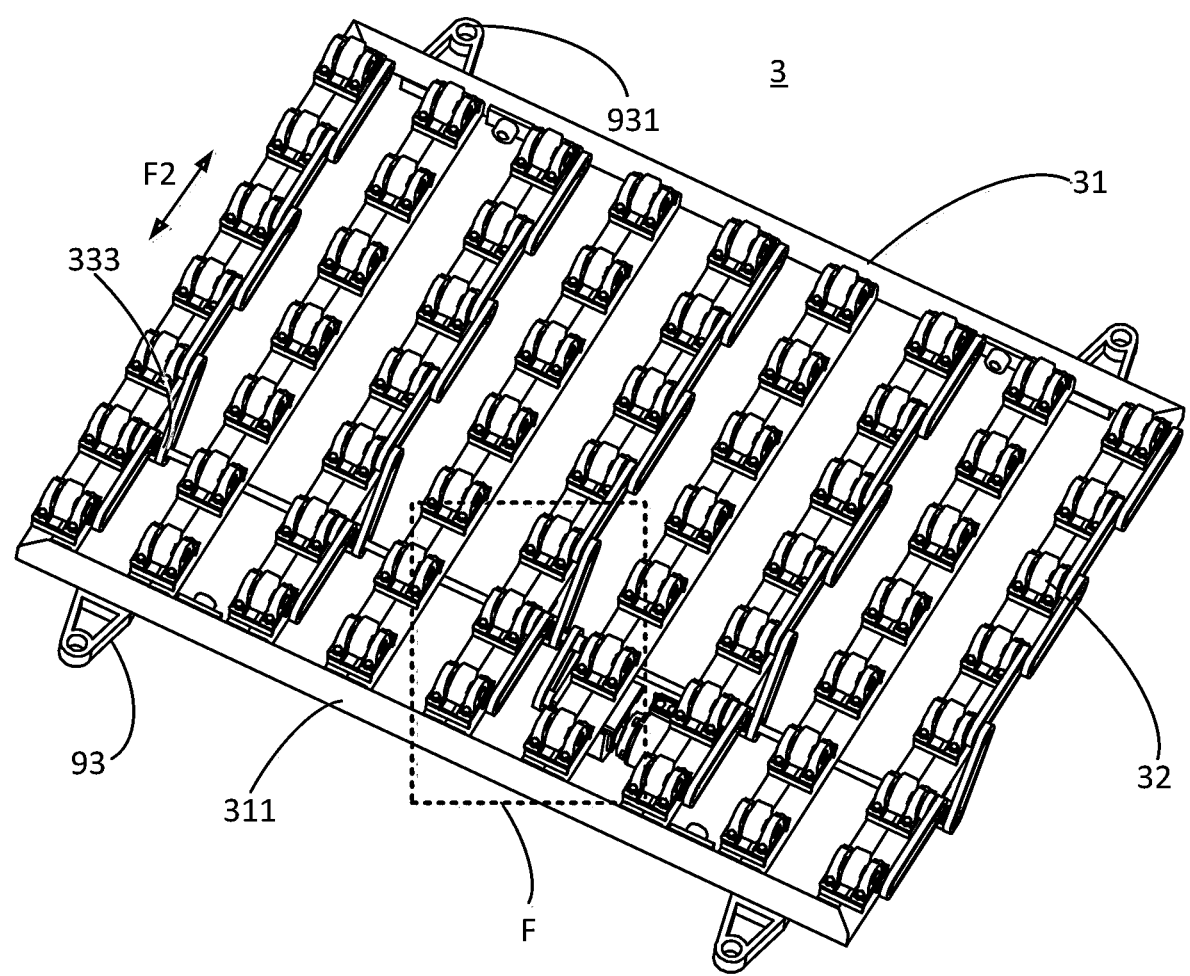
FIG. 12 shows a three-dimensional schematic diagram of a second conveying mechanism of a conveying device according to an exemplary embodiment of the present disclosure.
Figure 13:
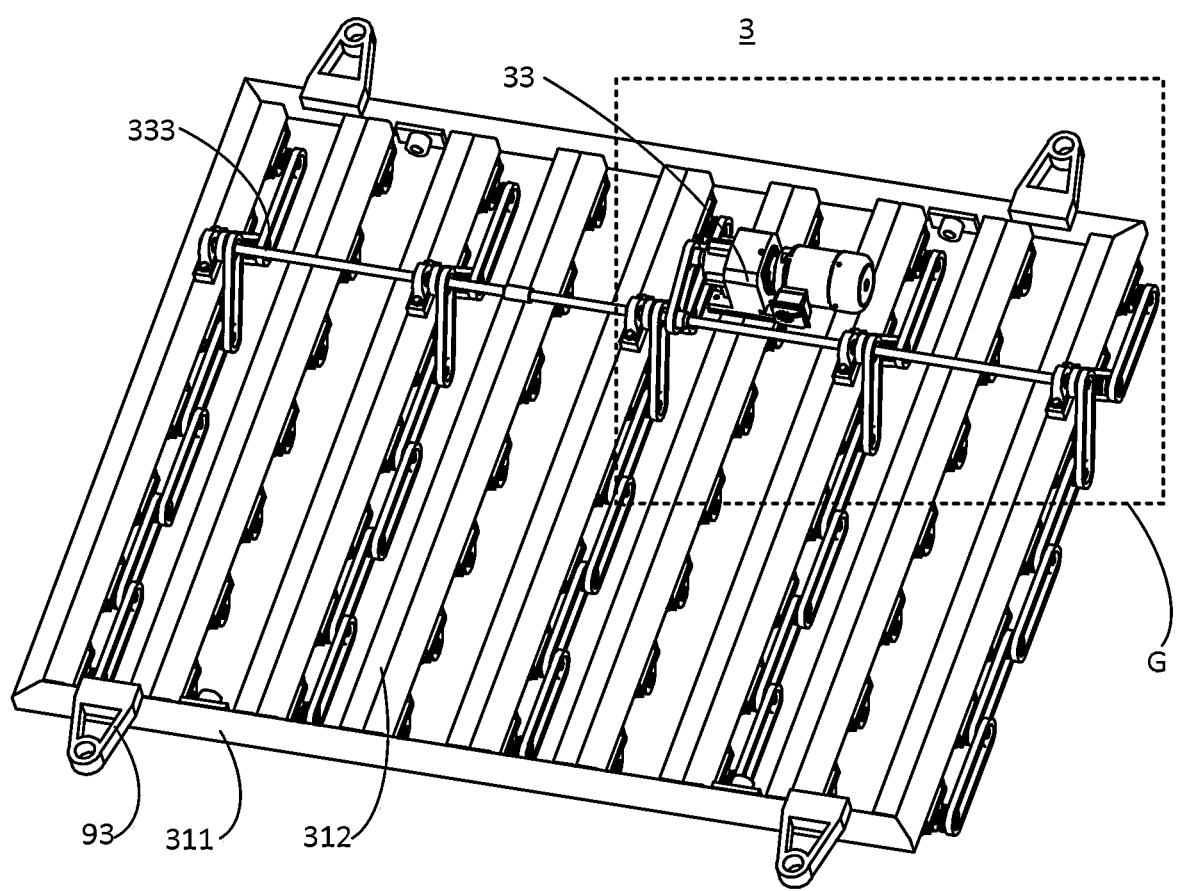
FIG. 13 shows another three-dimensional schematic diagram of the second conveying mechanism shown in FIG. 12.
Figure 14:
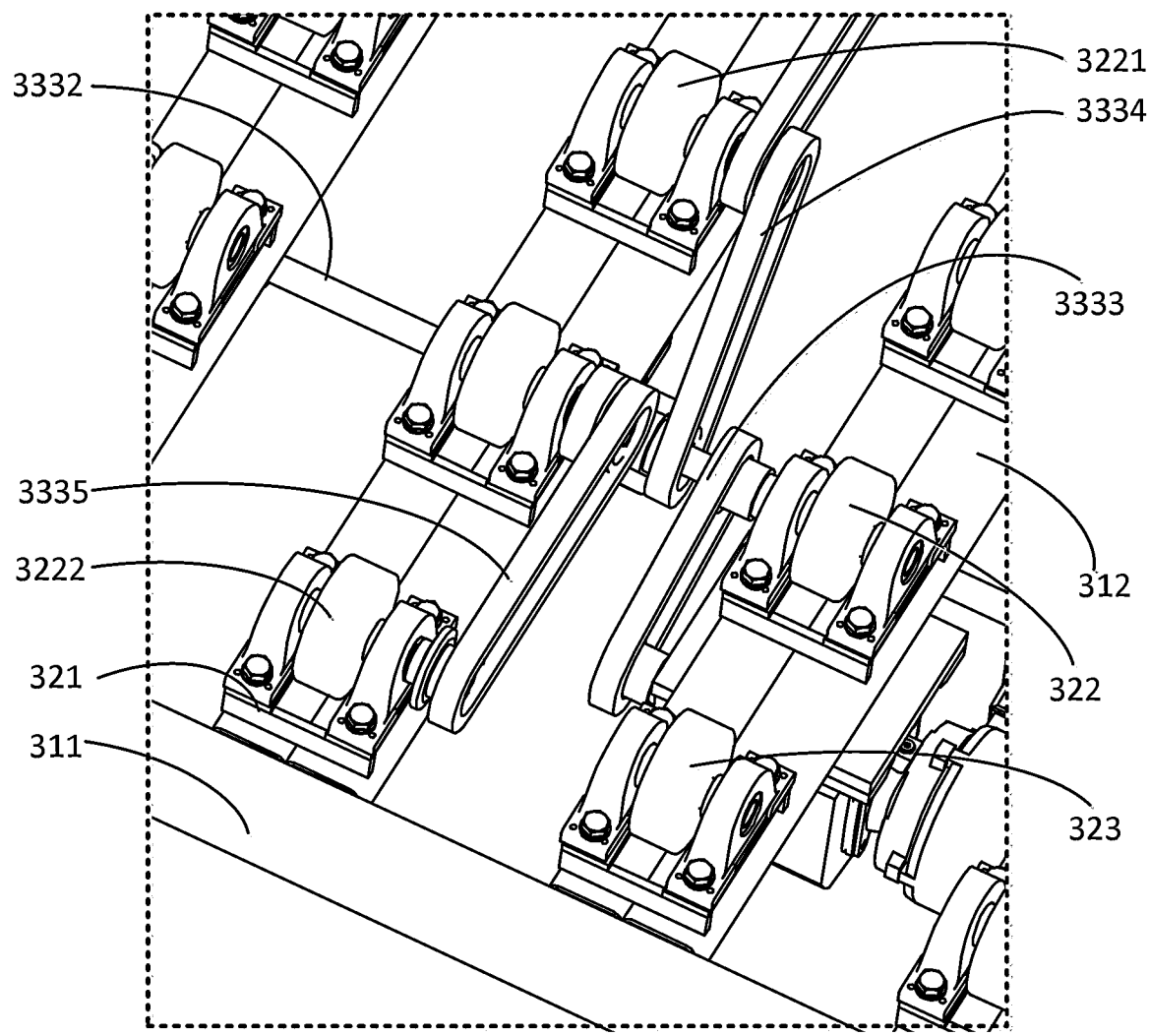
FIG. 14 shows an enlarged schematic diagram of a portion F shown in FIG. 12.
Figure 15:
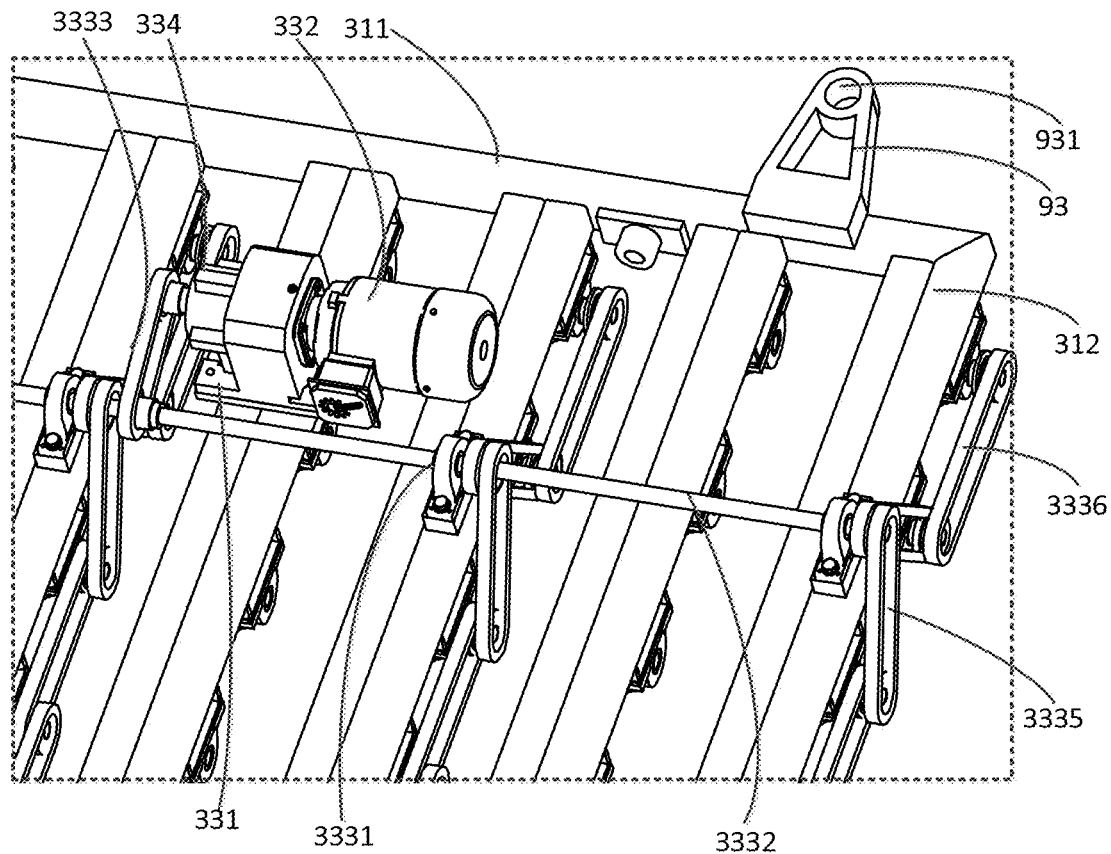
FIG. 15 shows an enlarged schematic diagram of a portion G shown in FIG. 13.

FIG. 12 shows a three-dimensional schematic diagram of a second conveying mechanism of a conveying device according to an exemplary embodiment of the present disclosure; FIG. 13 shows another three-dimensional schematic diagram of the second conveying mechanism shown in FIG. 12; FIG. 14 shows an enlarged schematic diagram of a portion F shown in FIG. 12; and FIG. 15 shows an enlarged schematic diagram of a portion G shown in FIG. 13.

In an exemplary embodiment, as shown in FIG. 2-4 and FIG. 12-15, the second conveying mechanism 3 includes: a third support frame 31 installed on the first support frame 1; a second rolling mechanism 32 installed on the third support frame 31 and suitable for carrying the goods 401 under a drive of the switching mechanism 4; and a third driving mechanism 33 suitable for driving the second rolling mechanism 32 to rotate relative to the third support frame 31. In this way, when the switching mechanism 4 lifts the third support frame 31 such that the second rolling mechanism 32 carries the goods, the third rolling mechanism 33 pushes the goods 401 to move in the second horizontal direction F2.

Figure 5:
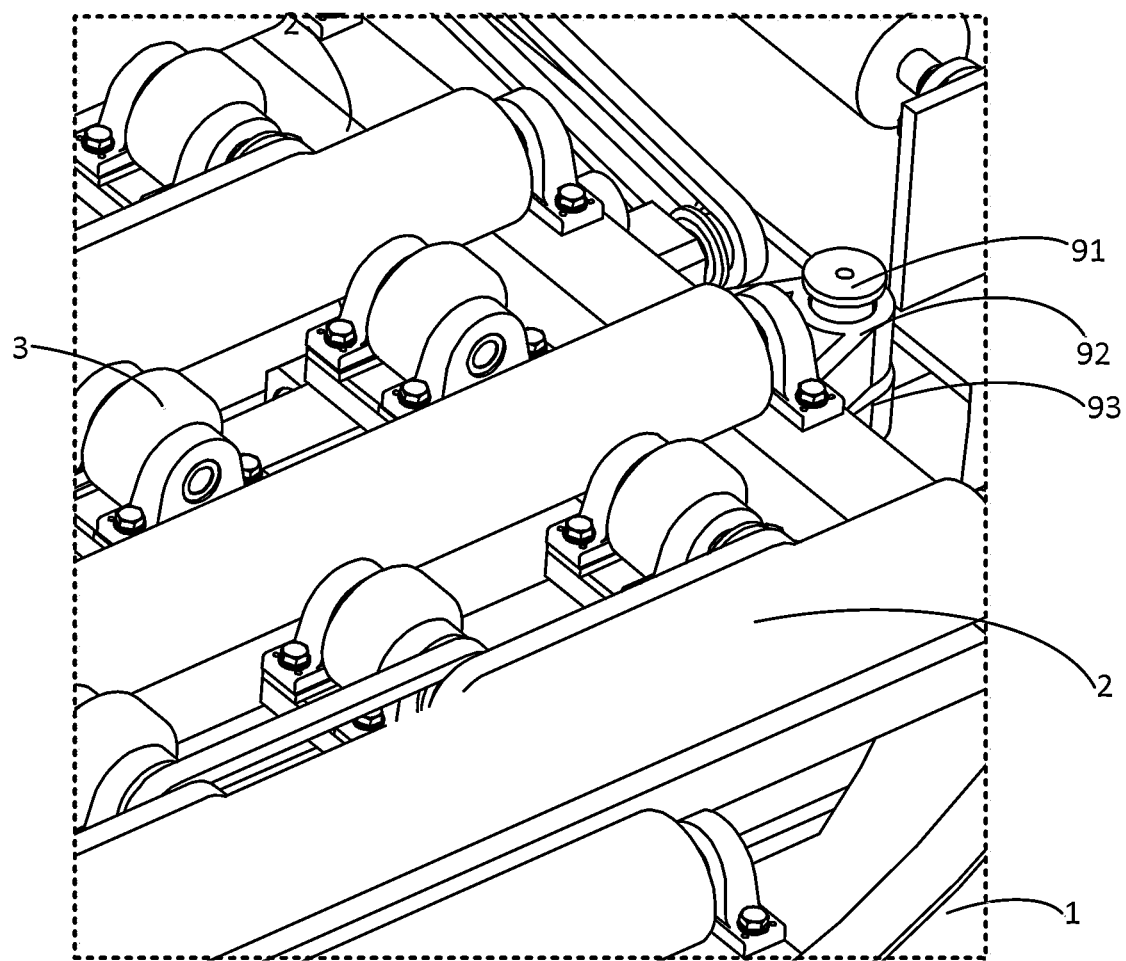
FIG. 5 shows an enlarged schematic diagram of a portion B shown in FIG. 2.
Figure 8:
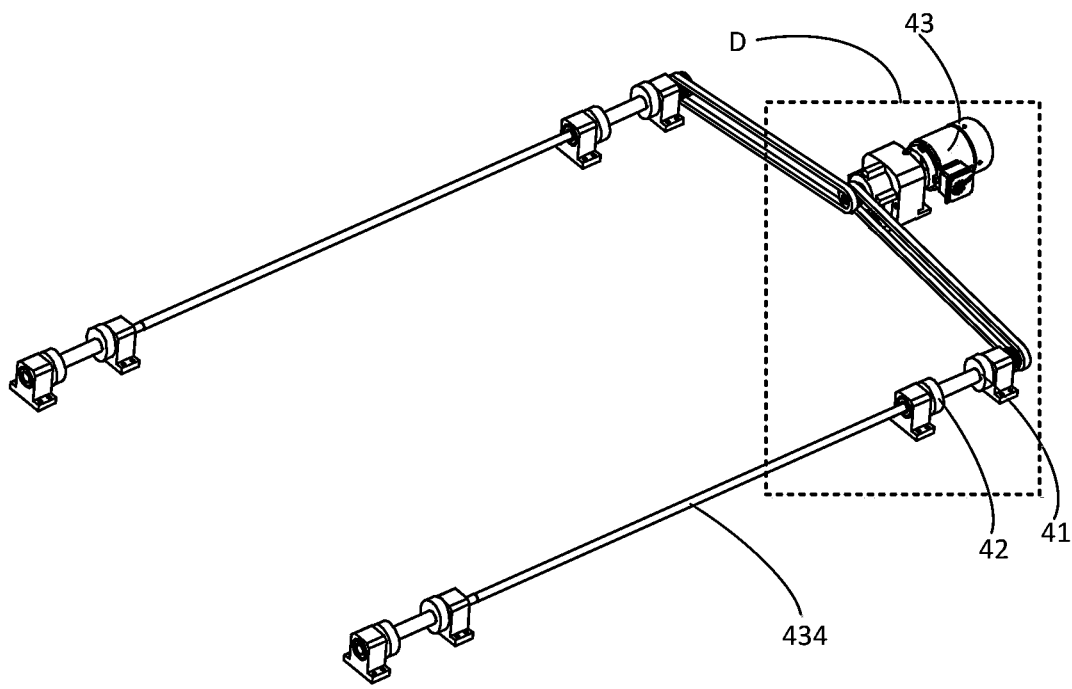
FIG. 8 shows a three-dimensional schematic diagram of a switching mechanism of a conveying device according to an exemplary embodiment of the present disclosure.
Figure 9:
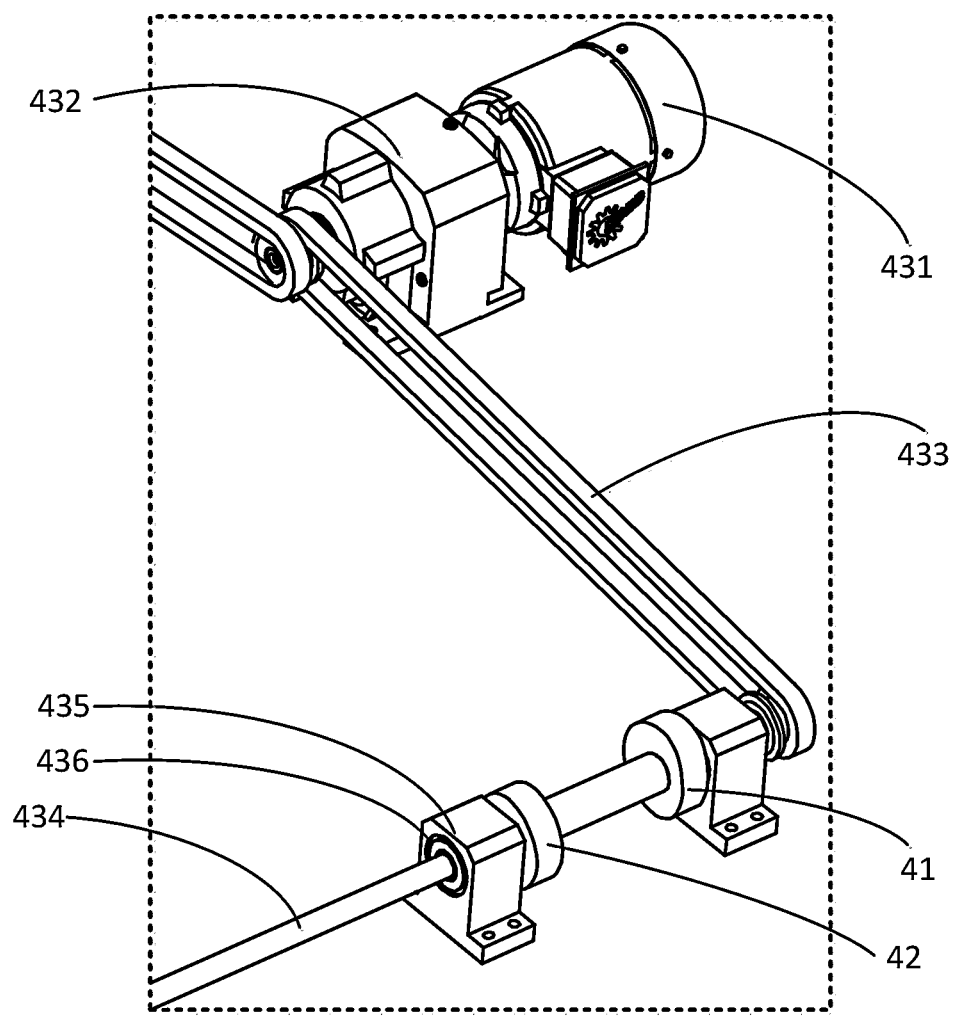
FIG. 9 shows an enlarged schematic diagram of a portion D shown in FIG. 8.

FIG. 5 shows an enlarged schematic diagram of a portion B shown in FIG. 2; FIG. 8 shows a three-dimensional schematic diagram of a switching mechanism of a conveying device according to an exemplary embodiment of the present disclosure; and FIG. 9 shows an enlarged schematic diagram of a portion D shown in FIG. 8.

In an exemplary embodiment, as shown in FIG. 5-6 and FIG. 8-9, the switching mechanism 4 includes: a plurality of first lifting mechanisms 41 suitable for lifting the second support frame 21; a plurality of second lifting mechanisms 42 suitable for lifting the third support frame 31; and a fourth driving mechanism 43 configured to selectively drive the plurality of first lifting mechanisms 41 to lift the second support frame 21, or drive the plurality of second lifting mechanisms 42 to lift the third support frame 31.

In an exemplary embodiment, as shown in FIG. 5, FIG. 6, FIG. 8 and FIG. 9, the fourth driving mechanism 43 includes: a second motor 431 and two first driving shafts 434, and the first driving shaft 434 rotates synchronously under a drive of the second motor 431. The first lifting mechanism 41 includes first cams 41 installed on the two first driving shafts 434, and the second lifting mechanism 42 includes second cams 42 installed on the two first driving shafts 434. The first cams 41 and the second cams 42 are suitable for respectively lifting the second support frame 21 and the third support frame 31 under a drive of the first driving shafts 434.

In an exemplary embodiment, the fourth driving mechanism 43 further includes: a first transmission mechanism 433 and a plurality of third support seats 435. The second motor 431 drives the two first driving shafts 434 to rotate through the first transmission mechanism 433. The plurality of third support seats 435 are installed on the first support frame 1, and the two first driving shafts 434 are rotatably supported on the third support seat 435 through a bearing 436. The first transmission mechanism 433 includes two first conveyor belts, and the second motor 431 respectively drives the two first driving shafts 434 to rotate through the first conveyor belts. In this way, the two first driving shafts 434 may be ensured to rotate synchronously. In an alternative embodiment, the second motor 431 may drive the two driving shafts 434 to rotate through a gear engagement. A reduction mechanism may be coupled to an output shaft of the second motor 431 so as to control a rotation angle and a rotation direction of the first driving shaft.

In an exemplary embodiment, the first cam 41 and the second cam 42 are configured such that: within a first angle range of a rotation of the first driving shaft 434, the first rolling mechanism 22 carries and conveys the goods 401 within the horizontal support surface, a maximum height of the second rolling mechanism 32 is not higher than the horizontal support surface, and the second rolling mechanism leaves the goods during a conveying of the goods by the first rolling mechanism 22, such that the second rolling mechanism 32 may not hinder the first rolling mechanism 22 from driving the goods to move in the first horizontal direction F1. On the other hand, within a second angle range of the rotation of the first driving shaft 434, the second rolling mechanism 32 carries and conveys the goods 401 within the horizontal support surface, a maximum height of the first rolling mechanism 22 is not higher than the horizontal support surface, and the first rolling mechanism leaves the goods during a conveying of the goods by the second rolling mechanism 32, such that the first rolling mechanism 22 may not hinder the second rolling mechanism 32 from driving the goods in the second horizontal direction F2. When the rotation of the first driving shaft 434 is transiting between the first angle range and the second angle range, the first rolling mechanism 22 and the second rolling mechanism 32 jointly support the goods within the horizontal support surface. In this way, during any operation, at least one of the first rolling mechanism 22 and the second rolling mechanism 32 carries the goods and maintains the goods on the horizontal support surface, such that the height of the goods remains substantially unchanged.

Figure 16:
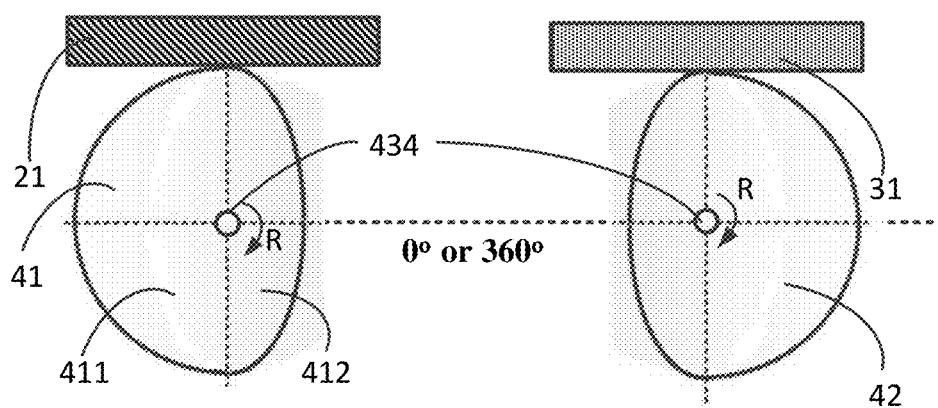
FIG. 16 shows working states of a first cam and a second cam when a first driving shaft is at 0° or 360° according to an exemplary embodiment of the present disclosure.
Figure 17:
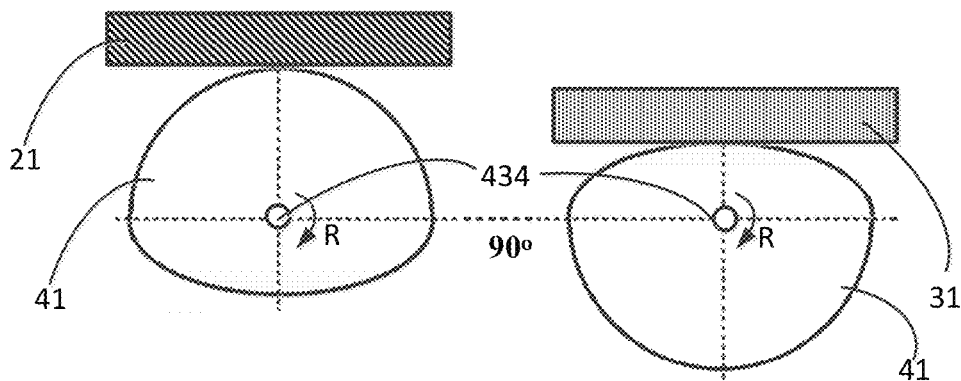
FIG. 17 shows working states of the first cam and the second cam when the first driving shaft shown in FIG. 16 is at 90°.
Figure 18:
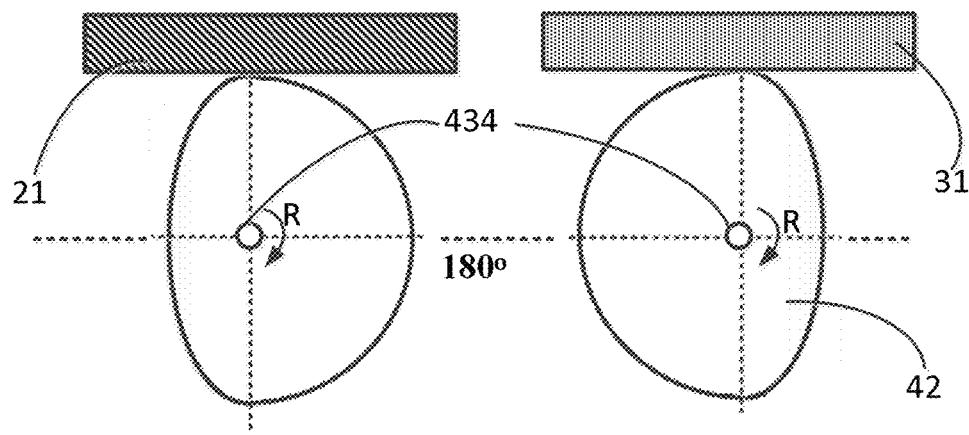
FIG. 18 shows working states of the first cam and the second cam when the first driving shaft shown in FIG. 16 is at 180°.
Figure 19:
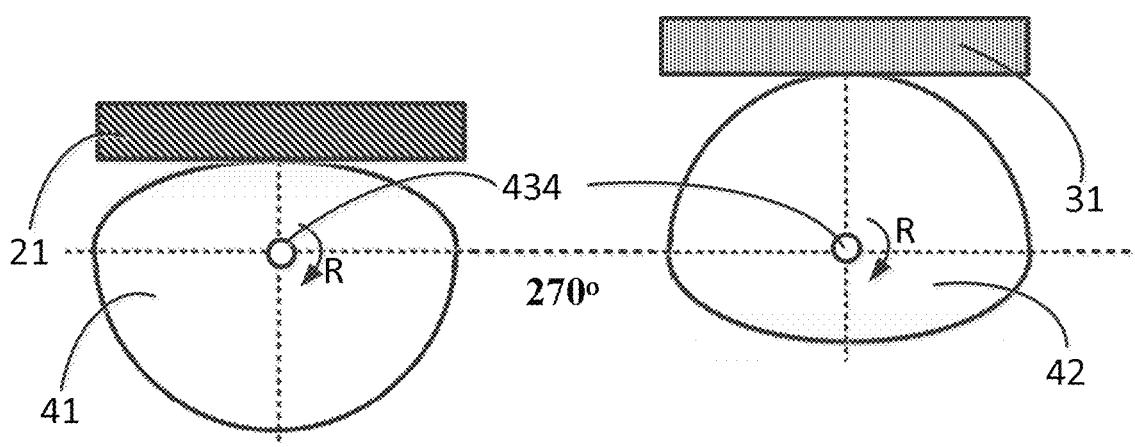
FIG. 19 shows working states of the first cam and the second cam when the first driving shaft shown in FIG. 16 is at 270°.

FIG. 16 shows working states of the first cam and the second cam when the first driving shaft is at 0° or 360° according to an exemplary embodiment of the present disclosure; FIG. 17 shows working states of the first cam and the second cam when the first driving shaft shown in FIG. 16 is at 90°; FIG. 18 shows working states of the first cam and the second cam when the first driving shaft shown in FIG. 16 is at 180°; and FIG. 19 shows working states of the first cam and the second cam when the first driving shaft shown in FIG. 16 is at 270°.

In an exemplary embodiment, as shown in FIG. 16, during the rotation of the first driving shaft 434 from 0 degree to 360 degrees, the first angle range is 0 degree to 180 degrees, and the second angle range is 180 degrees to 360 degrees. In an exemplary embodiment, each of the first cam 41 and the second cam 42 includes a first part 411 and a second part 412. In a cross section along a radial direction, a support surface of the first part 411 is a semicircular arc, a support surface of the second part 412 is an elliptical arc along a major axis of an ellipse, and the semicircular arc of the first part is smoothly connected to the elliptical arc of the second part.

Working states of the first cam 41 and the second cam 42 in different angle ranges during the rotation of the first driving shaft 434 from 0 degree to 360 degrees in a rotation direction R will be described with reference to FIG. 16 to FIG. 19.

As shown in FIG. 16, when the first driving shaft 434 is at 0° or 360°, a transition portion from a semicircular support portion of the first part 411 of the first cam 41 to an elliptical support portion of the second part 412 of the first cam 41 supports the second support frame 21, and a transition portion from the elliptical support portion of the second part 412 of the second cam 42 to the semicircular support portion of the first part 411 of the second cam 42 supports the second support frame 31. At this time, heights of highest support points of the first cam 41 and the second cam 42 are the same, such that both the first conveying mechanism 2 and the second conveying mechanism 3 may carry the goods within the horizontal support surface. However, both the first conveying mechanism 2 and the third conveying mechanism 3 are in a state where the goods may not be conveyed.

As shown in FIG. 17, when the first driving shaft 434 rotates to 90°, the semicircular support portion of the first part 411 of the first cam 41 supports the first support frame 21, and the height of the first support frame 21 remains unchanged. The first conveying mechanism 2 carries the goods within the horizontal support surface. At the same time, the height of the highest support point of the second portion 412 of the second cam 42 descends to the lowest, and the third support frame 31 descends with the rotation of the second cam 42, such that the second conveying mechanism 3 no longer carries the goods. In this case, the first conveying mechanism 2 conveys the goods to move in the first horizontal direction.

As shown in FIG. 18, when the first driving shaft 434 rotates to 180°, the semicircular support portion of the first part 411 of the first cam 41 still supports the first support frame 21, and the height of the first support frame 21 remains unchanged. The first conveying mechanism 2 carries the goods within the horizontal support surface. At the same time, the height of the highest support point of the second portion 412 of the second cam 42 rises to the highest, and the third support frame 31 rises to the highest with the rotation of the second cam 42. At this time, the heights of the highest support points of the first cam 41 and the second cam 42 are the same, such that both the first conveying mechanism 2 and the second conveying mechanism 3 may carry the goods within the horizontal support surface. However, both the first conveying mechanism 2 and the third conveying mechanism 3 are in the state where the goods may not be conveyed.

As shown in FIG. 19, when the first driving shaft 434 rotates to 270°, the semicircular support portion of the first part 411 of the second cam 42 still supports the third support frame 31, and a height of the third support frame 31 remains unchanged. The second conveying mechanism 3 carries the goods within the horizontal support surface. At the same time, the height of the highest support point of the second part 412 of the first cam 41 descends to the lowest, and the second support frame 21 descends with the rotation of the first cam 41, such that the first conveying mechanism 2 no longer carries the goods. In this case, the second conveying mechanism 3 conveys the goods to move in the second horizontal direction.

It may be understood that the first driving shaft 434 may continuously rotate in a clockwise or counterclockwise direction, or alternatively rotate in the clockwise and counterclockwise direction.

The embodiment in which both the first support frame and the second support frame may descend and rise has been described above. In an alternative embodiment, the first driving shaft may drive only one of the first support frame and the second support frame, and a height of the other of the first support frame and the second support frame remains unchanged. That is, the horizontal support surface of one of the first conveying mechanism and the second conveying mechanism is a variable support surface with a variable height, the horizontal support surface of the other of the first conveying mechanism and the second conveying mechanism is a fixed support surface with a constant height, and the height of the variable support surface may be higher or lower than the height of the fixed support surface. When the height of the variable support surface is lower than the height of the fixed support surface, the other conveying mechanism drives the goods to move; when the height of the variable support surface is higher than the height of the fixed support surface, the one conveying mechanism drives the goods to move.

In an exemplary embodiment, as shown in FIG. 10 and FIG. 11, the second support frame 21 includes: two first longitudinal frames 211 arranged opposite to each other, and two first transverse frames 212 arranged between the first longitudinal frames 211. The first rolling mechanism 22 includes: a plurality of pairs of fourth support seats 221 and a plurality of rollers 222 arranged parallel to each other. Each pair of fourth support seats 221 are installed opposite to each other on the two first longitudinal frames 211. Two ends of each of the plurality of rollers 222 are rotatably installed on a pair of fourth support seats 221 through a bearing to drive the goods 401 to move in the first horizontal direction F1. It may be understood that the roller 222 may also be replaced with a solid pin roller.

In an exemplary embodiment, as shown in FIG. 10 and FIG. 11, the second conveying mechanism 3 includes: a fifth support seat 231 installed on the first longitudinal support frame 211 of the second support frame 21; a third motor 232 installed on the fifth support seat 231; and a second transmission mechanism 233, wherein the third motor 232 drives the roller 222 to rotate through the second transmission mechanism 233. In an alternative embodiment, the third motor 232 may drive two rollers 222 to rotate through a gear engagement. A reduction mechanism 235 may be coupled to an output shaft of the third motor 232.

In an exemplary embodiment, as shown in FIG. 10 and FIG. 11, the second transmission mechanism 233 includes: a second conveyor belt 233 and a plurality of third conveyor belts 234. The third motor 232 drives a driving roller 2221 in the plurality of rollers to rotate through the second conveyor belt 233. The driving roller 2221 sequentially drives each driven roller 2222 in the plurality of rollers to rotate through the plurality of third conveyor belts 234. In this way, driven by the third motor 232, each roller 222 may rotate to push the goods carried on the roller 222 to move in the first horizontal direction F1.

In an exemplary embodiment, as shown in FIG. 2-4 and FIG. 6, the conveying device 100 further includes a plurality of first auxiliary rollers 81 installed on the first base of the first support frame 1 outside the first transverse frame 212, and each first auxiliary roller 81 is arranged parallel to the roller 222. In this way, when the goods passes through the auxiliary roller 81 driven by the roller 222 of the first conveying mechanism 2, the auxiliary roller 81 may rotatably support the goods, such that the goods may be stably conveyed to or removed from the first conveying mechanism.

In an exemplary embodiment, the first auxiliary roller 81 rotates under a drive of the goods during the conveying of the goods by the first conveying mechanism 2, such that the goods may keep smoothly moving.

In an embodiment, a first braking mechanism may be provided on a rotation shaft of at least part of the rollers. When the first conveying mechanism 2 stops conveying the goods, the first braking mechanism is controlled to lock the rotation shaft of said at least part of the rollers, such that said at least part of the rollers may not rotate, thereby preventing a further movement of the goods. In another embodiment, a first blocking mechanism that may protrude over or contract to be lower than the horizontal support surface is provided on the first support frame 1. When the first conveying mechanism 2 stops conveying the goods, the first blocking mechanism is controlled to protrude over the horizontal support surface, so as to prevent the further movement of the goods in the first horizontal direction. When the first conveying mechanism 2 conveys the goods, the first blocking mechanism is controlled to contract to be lower than the horizontal support surface, so as not to hinder the goods from moving in the first horizontal direction.

In an exemplary embodiment, as shown in FIG. 12 to FIG. 15, the third support frame 31 includes: two second longitudinal frames 311 arranged opposite to each other; and a plurality of second transverse frames 312, two ends of each second transverse frame 312 are installed between the second longitudinal frames 311 and located between two adjacent rollers 222. The second rolling mechanism 32 includes a plurality of rows of sixth support seats 321 and a plurality of rows of rolling wheels 322. Each row of sixth support seats 321 are installed on a second transverse frame 312. The plurality of rows of rolling wheels 322 are rotatably installed on the plurality of rows of sixth support seats 321, respectively, and a rotation shaft of each roller extends perpendicular to the second horizontal direction F2 to drive the goods to move in the second horizontal direction. By using the configuration, the roller 222 and the rolling wheel 322 are nested with each other or alternately arranged, and directions of conveying the goods are perpendicular to each other.

Those of ordinary skill in the art may understand that, sizes of the first support frame, the first conveying mechanism and the second conveying mechanism may be changed according to different weights and sizes of the conveyed goods, such as a sea container or an air container, and the number of rollers and rolling wheels may be increased or reduced accordingly. In an embodiment, the rollers and the rolling wheels are uniformly arranged.

In an exemplary embodiment, as shown in FIG. 12 to FIG. 15, the third driving mechanism includes: a seventh support seat 331 installed on the second transverse frame 312 of the third support frame 31; a fourth motor 332 installed on the seventh support seat 331; and a third transmission mechanism 333, wherein the fourth motor 332 drives each rolling wheel 322 to rotate through the third transmission mechanism 333. A reduction mechanism 334 may be coupled to an output shaft of the fourth motor 332.

In an exemplary embodiment, the third transmission mechanism 333 includes: a plurality of eighth support seats 3331, a second driving shaft 3332, a fourth conveyor belt 3333, a fifth conveyor belt 3334, and a plurality of sixth conveyor belts 3335. The eighth support seats 3331 are installed at a lower portion of the second transverse frame 312; the second driving shaft 3332 is rotatably installed on the eighth support seat 3331 through a bearing and extends in a direction perpendicular to the second horizontal direction F2; the fourth motor 332 drives the second driving shaft 3332 to rotate through the fourth conveyor belt 3333; the second driving shaft 3332 drives a first rolling wheel 3221 in each row of rolling wheels to rotate through the fifth conveyor belt 3334; the first rolling wheel 3221 sequentially drives each second rolling wheel 3222 in each row of rolling wheels to rotate through the plurality of sixth conveyor belts 3335.

In an embodiment, a combination of the first conveyor belt, the second conveyor belt, the third conveyor belt, the fourth conveyor belt, the fifth conveyor belt, and the sixth conveyor belt with belt pulleys may be replaced with a combination of a sprocket and a chain.

In an exemplary embodiment, as shown in FIG. 12 to FIG. 15, the second rolling mechanism 32 further includes: a plurality of rows of auxiliary rolling wheels 323, and each row of auxiliary rolling wheels 323 are rotatably installed on the sixth support seat 321 between two rows of rolling wheels 322. The auxiliary rolling wheel 323 is provided as an inert wheel with no driving function. The auxiliary rolling wheel 323 rotates under a drive of the goods while the goods moves on the second conveying mechanism 3, so as to keep the goods smoothly moving.

In an exemplary embodiment, as shown in FIG. 2 to FIG. 4 and FIG. 6, the conveying device 100 further includes: a plurality of second auxiliary rollers 82 arranged on the first support frame 1 outside the first longitudinal frame 211, and each second auxiliary roller 82 is arranged parallel to an axis of the rolling wheel 322. In this way, when the goods are driven by the rolling wheel 322 of the second conveying mechanism 3 and pass through the auxiliary roller 82, the auxiliary roller 82 may rotatably support the goods, such that the goods may be smoothly conveyed to or removed from the second conveying mechanism.

In an exemplary embodiment, the second auxiliary roller 82 rotates under the drive of the goods during the conveying of the goods by the second conveying mechanism 3, so as to keep the goods smoothly moving.

In an embodiment, a second blocking mechanism that may protrude over or contract to be lower than the horizontal support surface is provided on the first support frame 1. When the second conveying mechanism 3 stops conveying the goods, the second blocking mechanism is controlled to protrude over the horizontal support surface, so as to prevent a further movement of the goods in the second horizontal direction; when the second conveying mechanism 3 conveys the goods, the second blocking mechanism is controlled to contract to be lower than the horizontal support surface, so as not to hinder the goods from moving in the second horizontal direction.

In an exemplary embodiment, as shown in FIG. 2 to FIG. 6 and FIG. 12 to FIG. 14, the conveying device 100 further includes: a guide mechanism 9 suitable for guiding the second support frame 21 and the third support frame 31 to move in the vertical direction, so as to prevent the second support frame 21 and the third support frame 31 from moving horizontally relative to the first support frame 1. In an exemplary embodiment, the guide mechanism 9 includes: a plurality of guide columns 91 installed on the first base of the first support frame 1 in the vertical direction; a plurality of first guide blocks 92 installed on the second support frame 21; and a plurality of second guide blocks 93 installed on the third support frame 31. Each first guide block 92 is provided with a guide hole 921 matched with the guide column 91, and each second guide block 93 is provided with a guide hole 931 matched with the guide column 91. Both first guide block 92 and second guide block 93 move up and down along the guide column 91 in the vertical direction.

In an exemplary embodiment, one first guide block 92 and one second guide block 93 share one guide column 91, there is a gap between the first guide block 92 and the second guide block 93 in the vertical direction, and the gap is not less than a maximum height of a movement of the first conveying mechanism 2 or the second conveying mechanism 3 in the vertical direction. In this way, a movement of the first conveying mechanism 2 in the vertical direction or a movement of the second conveying mechanism 3 in the vertical direction do not interfere with each other. In an alternative embodiment, each first guide block 92 and each second guide block 93 match with different guide columns.

In an exemplary embodiment, there is further provided with a sensor suitable for detecting whether the conveying device is provided with the goods, whether the goods are being loaded onto the conveying device, and whether the goods are being unloaded from the conveying device. The sensor may include any one of a weight sensor, an optical sensor, and a proximity switch.

For the conveying device and the inspection system according to embodiments of the present disclosure, the conveying device has functions of rotating and bidirectional (forward and backward) conveying goods such as the sea container and the air container, and may achieve a positioning and a smooth continuous conveying of the goods. The conveying device may be combined with a radiation inspection system including a CT machine so as to achieve a smooth conveying and a calibrated positioning of the goods in different postures. The conveying device has characteristics of high accuracy, smooth operation, compact structure, automatic connection and conveying, etc., and is suitable for an aviation box CT detection system. The conveying device may achieve a seamless docking with an existing conveying apparatus in an airport/freight station.

Those of ordinary skill in the art may understand that the above-mentioned embodiments are exemplary, and improvements may be made by those of ordinary skill in the art. The structures described in various embodiments may be freely combined without a conflict in structures or principles.

Although the present disclosure has been described with reference to the accompanying drawings, embodiments disclosed in the accompanying drawings are intended to provide exemplary descriptions of preferred embodiments of the present disclosure and may not be construed as limiting the present disclosure. Although some embodiments of the inventive concept of the present disclosure have been shown and described, those of ordinary skill in the art may understand that changes may be made to these embodiments without departing from the principle and spirit of the general inventive concept. The scope of the present disclosure is defined by the claims and their equivalents.

What is claimed is:

1. A conveying device (100), comprising:
    a first support frame (1);
    a first conveying mechanism (2) and a second conveying mechanism (3) which are installed on the first support frame; and
    a switching mechanism (4) configured to selectively lift the first conveying mechanism or the second conveying mechanism in a vertical direction, such that the first conveying mechanism or the second conveying mechanism carries goods (401) and conveys the goods in a first horizontal direction (F1) or a second horizontal direction (F2) different from the first horizontal direction,
    wherein the first conveying mechanism comprises: a second support frame (21) installed on the first support frame; a first rolling mechanism (22) installed on the second support frame and suitable for carrying the goods under a drive of the switching mechanism; and a second driving mechanism (23) suitable for driving the first rolling mechanism to rotate relative to the second support frame, such that the first rolling mechanism pushes the goods to move in the first horizontal direction;
    wherein the second conveying mechanism comprises: a third support frame (31) installed on the first support frame; a second rolling mechanism (32) installed on the third support frame and suitable for carrying the goods under the drive of the switching mechanism; and a third driving mechanism (33) suitable for driving the second rolling mechanism to rotate relative to the third support frame, such that the second rolling mechanism pushes the goods to move in the second horizontal direction;
    wherein the switching mechanism comprises: a plurality of first lifting mechanisms (41) suitable for lifting the second support frame; a plurality of second lifting mechanisms (42) suitable for lifting the third support frame; and a fourth driving mechanism (43) configured to selectively drive the plurality of first lifting mechanisms to lift the second support frame, or drive the plurality of second lifting mechanisms to lift the third support frame.

2. The conveying device according to claim 1, further comprising: a fixation base (5), wherein the first support frame is rotatably installed on the fixation base.

3. The conveying device according to claim 2, wherein the first support frame comprises:
    an annular frame (11);
    a first base (12,13) installed at a lower portion of the annular frame; and
    a rotating ring (14) arranged on the first base and located at a center of the annular frame, and
    wherein the fixation base comprises:
    a second base (51) fixedly installed relative to the ground; and
    a first pivot (52) fixed on the second base, wherein the rotating ring is rotatably installed on the first pivot.

4. The conveying device according to claim 3, further comprising: a first driving mechanism (6) configured to drive the rotating ring to rotate relative to the fixation base.

5. The conveying device according to claim 4, wherein the first driving mechanism comprises:
    a first support seat (61) fixedly installed relative to the ground;
    a first motor (62) installed on the first support seat; and
    a first driving wheel (63) installed on a driving shaft of the first motor, wherein the first driving wheel (63) is in rotatable contact with the annular frame so as to drive the rotating ring to rotate.

6. The conveying device according to claim 3, further comprising: a plurality of balance mechanisms (7) fixedly installed relative to the ground and rotatably supported at the lower portion of the annular frame at a predetermined interval, so as to keep a transverse frame substantially parallel to a horizontal plane;
    wherein each of the plurality of balance mechanisms comprises:
    a second support seat (71) fixedly installed relative to the ground; and
    at least one first rolling wheel (72) installed on the second support seat, wherein the at least one first rolling wheel rotatably supports the annular frame.

7. The conveying device according to claim 1, wherein the fourth driving mechanism comprises:
    a second motor (431); and
    two first driving shafts (434) configured to rotate synchronously under a drive of the second motor,
    wherein the first lifting mechanism comprises first cams (41) installed on the two first driving shafts, and the second lifting mechanism comprises second cams (42) installed on the two first driving shafts, and
    wherein the first cam and the second cam are suitable for respectively lifting the second support frame and the third support frame under a drive of the first driving shaft.

8. The conveying device according to claim 7, wherein the first cam and the second cam are configured such that:
    within a first angle range of a rotation of the first driving shaft, the first rolling mechanism carries and conveys the goods within the horizontal support surface, a maximum height of the second rolling mechanism is not higher than the horizontal support surface, and the second rolling mechanism leaves the goods during the first rolling mechanism conveying the goods;

within a second angle range of the rotation of the first driving shaft, the second rolling mechanism carries and conveys the goods within the horizontal support surface; a maximum height of the first rolling mechanism is not higher than the horizontal support surface, and the first rolling mechanism leaves the goods during the second rolling mechanism conveying of the goods, and when the rotation of the first driving shaft is transiting between the first angle range and the second angle range, the first rolling mechanism and the second rolling mechanism jointly support the goods within the horizontal support surface; and wherein during the rotation of the first driving shaft from 0 degree to 360 degrees, the first angle range is 0 degree to 180 degrees, and the second angle range is 180 degrees to 360 degrees.

9. The conveying device according to claim 8, wherein each of the first cam and the second cam comprises a first part (411) and a second part (412), and wherein in a cross section along a radial direction, a support surface of the first part is a semicircular arc, a support surface of the second part is an elliptical arc along a major axis of an ellipse, and the semicircular arc of the first part is smoothly connected to the elliptical arc of the second part.

10. The conveying device according to claim 7, wherein the fourth driving mechanism further comprises:

a first transmission mechanism (433), wherein the second motor drives the two first driving shafts to rotate through the first transmission mechanism; and a plurality of third support seats (435) installed on the first support frame, wherein the two first driving shafts are rotatably supported on the third support seats; and wherein the first transmission mechanism comprises two first conveyor belts, and the second motor respectively drives the two first driving shafts to rotate through the first conveyor belts.

11. The conveying device according to claim 1, wherein the second support frame comprises:

two first longitudinal frames (211) arranged opposite to each other, and two first transverse frames (212) arranged between the first longitudinal frames;

wherein the first rolling mechanism comprises:

a plurality of pairs of fourth support seats (221), wherein each pair of fourth support seats are installed opposite to each other on the two first longitudinal frames; and a plurality of rollers (222) arranged parallel to each other, wherein two ends of each of the plurality of rollers are rotatably installed on a pair of fourth support seats so as to drive the goods to move in the first horizontal direction;

wherein the second driving mechanism comprises:

a fifth support seat (231) installed on the second support frame;

a third motor (232) installed on the fifth support seat; and a second transmission mechanism (233), wherein the third motor drives the roller to rotate through the second transmission mechanism; and wherein the second transmission mechanism comprises:

a second conveyor belt (233), wherein the third motor drives a driving roller (2221) in the plurality of rollers to rotate through the second conveyor belt; and a plurality of third conveyor belts (234), wherein the driving roller sequentially drives each driven roller in the plurality of rolling drums to rotate through the plurality of third conveyor belts.

12. The conveying device according to claim 11, further comprising: a plurality of first auxiliary roller (81) arranged on the first support frame outside the first transverse frame, wherein each of the plurality of first auxiliary rollers is arranged parallel to the roller;

wherein the first auxiliary roller rotates under a drive of the goods during the first conveying mechanism conveying the goods.

13. The conveying device according to claim 11, wherein the third support frame comprises:

two second longitudinal frames (311) arranged opposite to each other; and a plurality of second transverse frames (312), wherein two ends of each of the plurality of second transverse frames are installed between the second longitudinal frames and located between two adjacent rollers;

wherein the second rolling mechanism comprises:

a plurality of rows of sixth support seats (321), wherein each row of sixth support seats are installed on a second transverse frame; and a plurality of rows of rolling wheels (322) rotatably installed on the plurality of rows of sixth support seats, respectively, wherein a rotation shaft of each rolling wheel extends perpendicular to the second horizontal direction so as to drive the goods to move in the second horizontal direction;

wherein the third driving mechanism comprises:

a seventh support seat (331) installed on the third support frame;

a fourth motor (332) installed on the seventh support seat; and a third transmission mechanism (333), wherein the fourth motor drives each rolling wheel to rotate through the third transmission mechanism; and wherein the third transmission mechanism comprises:

a plurality of eighth support seats (3331) installed at a lower portion of the second transverse frame;

a second driving shaft (3332) rotatably installed on the eighth support seat, wherein the second driving shaft extends in a direction perpendicular to the second horizontal direction;

a fourth conveyor belt (3333), wherein the fourth motor drives the second driving shaft to rotate through the fourth conveyor belt;

a fifth conveyor belt (3334), wherein the second driving shaft drives a first rolling wheel (3221) in each row of rolling wheels to rotate through the fifth conveyor belt; and a plurality of sixth conveyor belts (3335), wherein the first rolling wheel sequentially drives each second rolling wheel (3222) in each row of rolling wheels to rotate through the plurality of sixth conveyor belts.

14. The conveying device according to claim 13, wherein the second rolling mechanism further comprises: a plurality of rows of auxiliary rolling wheels (323), wherein each row of auxiliary rolling wheels are rotatably installed on the sixth support seat between two adjacent rows of rolling wheels;

wherein the conveying device further comprises: a plurality of second auxiliary rollers (82) arranged on the first support frame outside the first longitudinal frame, wherein each of the plurality of second auxiliary rollers is arranged parallel to an axis of the rolling wheel; and wherein the second auxiliary roller rotates under a drive of the goods during the second conveying mechanism conveying the goods.

15. The conveying device according to claim 1, further comprising: a guide mechanism (9) suitable for guiding the second support frame and the third support frame to move in the vertical direction;

wherein the guide mechanism comprises:
a plurality of guide columns (91) installed on the first support frame in the vertical direction;
a plurality of first guide blocks (92) installed on the second support frame, wherein each of the plurality of first guide blocks is provided with a guide hole (821) matched with the guide column; and
a plurality of second guide blocks (93) installed on the third support frame, wherein each of the plurality of second guide blocks is provided with a guide hole (931) matched with the guide column; and
wherein one first guide block and one second guide block share one guide column, there is a gap between the first guide block and the second guide block in the vertical direction, and the gap is not less than a maximum height of a movement of the first conveying mechanism or the second conveying mechanism in the vertical direction.

16. The conveying device according to claim 1, further comprising: a sensor suitable for detecting that the conveying device is provided with the goods, the goods are being loaded onto the conveying device and the goods are being unloaded from the conveying device.

17. An inspection system (1000), comprising:
an inspection channel (200);
one or two conveying devices according to claim 1, wherein the conveying device is installed outside at least one of an entrance and an exit of the inspection channel so as to convey the goods into the inspection channel and/or receive the goods output from the inspection channel; and
an inspection device (300) configured to inspect the goods conveyed by the conveying device.

* * * * *